(12) United States Patent
Glatfelter et al.

(10) Patent No.: US 11,354,948 B2
(45) Date of Patent: Jun. 7, 2022

(54) METHODS AND SYSTEMS FOR PERFORMING MAINTENANCE ON AN AIRCRAFT

(71) Applicant: The Boeing Company, Chicago, IL (US)

(72) Inventors: John W. Glatfelter, Chicago, IL (US); Brian D. Laughlin, Chicago, IL (US); William D. Kelsey, Chicago, IL (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 16/435,673

(22) Filed: Jun. 10, 2019

(65) Prior Publication Data
US 2020/0388090 A1   Dec. 10, 2020

(51) Int. Cl.
*G07C 5/08* (2006.01)
*H04W 84/18* (2009.01)
(Continued)

(52) U.S. Cl.
CPC .......... *G07C 5/0816* (2013.01); *B64D 45/00* (2013.01); *G07C 5/02* (2013.01); *G07C 5/0841* (2013.01);
(Continued)

(58) Field of Classification Search
None
See application file for complete search history.

(56) References Cited

U.S. PATENT DOCUMENTS

2010/0057277 A1* 3/2010 Goodrich .............. G07C 5/085
701/14
2015/0217857 A1* 8/2015 Mesguen .............. B64D 43/00
701/3

(Continued)

FOREIGN PATENT DOCUMENTS

FR          3011115 A1 *  3/2015  .............. G01D 7/02

OTHER PUBLICATIONS

Knight et al. English Translation (Corresponding to Foreign Publication FR-3011115-A1) (Year: 2015).*

*Primary Examiner* — James J Lee
*Assistant Examiner* — Tawri M Matsushige
(74) *Attorney, Agent, or Firm* — McDonnell Boehnen Hulbert & Berghoff LLP

(57) ABSTRACT

An example method of performing maintenance on an aircraft includes receiving a vehicle data-signature-map of an interior of an aircraft for at least one parameter of the aircraft, and the vehicle data-signature-map is based on sensor outputs received from sensors of mobile devices positioned at locations in the interior of the aircraft. The method also includes comparing the vehicle data-signature-map with a previous vehicle data-signature-map, based on differences of the vehicle data-signature-map as compared to the previous vehicle data-signature-map making a determination for maintenance, and generating and outputting a recommendation for inspection of an identified portion of the aircraft based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

20 Claims, 11 Drawing Sheets

(51) Int. Cl.
*G07C 5/02* (2006.01)
*B64D 45/00* (2006.01)
*G07C 5/10* (2006.01)

(52) U.S. Cl.
CPC ........ *G07C 5/10* (2013.01); *B64D 2045/0085* (2013.01); *H04W 84/18* (2013.01)

(56) References Cited

U.S. PATENT DOCUMENTS

| | | | |
|---|---|---|---|
| 2015/0261379 A1* | 9/2015 | Kneuper | G08G 5/0052 345/173 |
| 2016/0356922 A1* | 12/2016 | Mccann | G01W 1/10 |
| 2017/0060125 A1* | 3/2017 | Beaven | G05B 23/0235 |
| 2018/0281990 A1* | 10/2018 | Fagan | B64D 11/00155 |
| 2019/0279439 A1* | 9/2019 | Fields | G06Q 30/02 |
| 2019/0308579 A1* | 10/2019 | Jouper | B60R 21/01542 |
| 2019/0382128 A1* | 12/2019 | Prost | G01N 29/24 |
| 2020/0079524 A1* | 3/2020 | Escobar | B64D 11/0015 |
| 2020/0180790 A1* | 6/2020 | Ramaswamy | G08G 5/0004 |

\* cited by examiner

METHODS AND SYSTEMS FOR PERFORMING MAINTENANCE ON AN AIRCRAFT

FIELD

The present disclosure relates generally to a real-time ad hoc network sensor system, and more particularly, to creating a vehicle data-signature-map of an interior of a vehicle aircraft for at least one parameter of the vehicle using the network sensor system. The present disclosure also relates to using the vehicle data-signature-map to determine maintenance scheduling for the aircraft as well as to make recommendations for inspection of specific portions of the aircraft to assist with the maintenance.

BACKGROUND

Existing aircraft typically are outfitted with sensors during a build process in areas throughout the aircraft. Example sensors include weather radar to assist with storm avoidance during flight, or electronic sensors such as altimeters used to measure altitude of the aircraft above ground to assist with precision approaches. In other areas of the aircraft, such as on the engines, large quantities of sensors may be installed to generate massive amounts of data detailing operation of the engines.

On an interior of the aircraft, however, a limited suite of sensors are usually installed, such as temperature or light sensors, during the build process. Adding new or additional sensors can be a time-consuming process and typically is not performed without prior certification of kits or upgrades of the sensors.

However, having knowledge of parameters in an interior of the aircraft during flight can provide many benefits and improve passenger experience. It would be desirable to obtain large datasets of sensed parameters in the interior of the aircraft for analysis without having to install hundreds of new sensors throughout a fuselage, for example.

SUMMARY

In an example, a real-time ad hoc network sensor system is described. The system comprises a plurality of sensors positioned at fixed locations on an aircraft, a plurality of mobile devices in an interior of the aircraft and the plurality of mobile devices include sensors, and a computing device having one or more processors and a non-transitory computer readable medium having stored thereon instructions, that when executed by the one or more processors, cause the computing device to perform functions. The functions comprise receiving outputs from the plurality of sensors during a flight of the aircraft, receiving outputs from the sensors of the plurality of mobile devices during the flight of the aircraft and the outputs from the sensors of the plurality of mobile devices are associated with a respective location of the plurality of mobile devices in the interior of the aircraft, mapping the outputs from the plurality of sensors and the outputs from the sensors of the plurality of mobile devices to a computer model of the aircraft for association with locations in the interior of the aircraft, and based on mapping the outputs from the plurality of sensors and the outputs from the sensors of the plurality of mobile devices to the computer model of the aircraft, creating a vehicle data-signature-map of the interior of the aircraft for at least one parameter of the aircraft.

In another example, a method is described that comprises receiving outputs from a plurality of sensors positioned at fixed locations on an aircraft during a flight of the aircraft, receiving outputs from sensors of a plurality of mobile devices in an interior of the aircraft during the flight of the aircraft and the outputs from the sensors of the plurality of mobile devices are associated with a respective location of the plurality of mobile devices in the interior of the aircraft, mapping the outputs from the plurality of sensors and the outputs from the sensors of the plurality of mobile devices to a computer model of the aircraft for association with locations in the interior of the aircraft, and based on mapping the outputs from the plurality of sensors and the outputs from the sensors of the plurality of mobile devices to the computer model of the aircraft, creating a vehicle data-signature-map of the interior of the aircraft for at least one parameter of the aircraft.

In another example, a non-transitory computer readable medium is described having stored thereon instructions, that when executed by one or more processors of a computing device, cause the computing device to perform functions. The functions comprise receiving outputs from a plurality of sensors positioned at fixed locations on an aircraft during a flight of the aircraft, receiving outputs from sensors of a plurality of mobile devices in an interior of the aircraft during the flight of the aircraft and the outputs from the sensors of the plurality of mobile devices are associated with a respective location of the plurality of mobile devices in the interior of the aircraft, mapping the outputs from the plurality of sensors and the outputs from the sensors of the plurality of mobile devices to a computer model of the aircraft for association with locations in the interior of the aircraft, and based on mapping the outputs from the plurality of sensors and the outputs from the sensors of the plurality of mobile devices to the computer model of the aircraft, creating a vehicle data-signature-map of the interior of the aircraft for at least one parameter of the aircraft.

In a further example, a method of performing maintenance on an aircraft is described. The method comprises receiving, at a computing device, a vehicle data-signature-map of an interior of an aircraft for at least one parameter of the aircraft, and the vehicle data-signature-map is based on sensor outputs for the at least one parameter obtained during flight of the aircraft and received from sensors of mobile devices positioned at locations in the interior of the aircraft, and the vehicle data-signature-map is indicative of a distribution of the at least one parameter within the interior of the aircraft. The method also includes comparing the vehicle data-signature-map with a previous vehicle data-signature-map of the aircraft, and based on differences of the vehicle data-signature-map as compared to the previous vehicle data-signature-map, making a determination for maintenance of the aircraft. The method further includes generating and outputting, by the computing device, a recommendation for inspection of an identified portion of the aircraft based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

In another further example, a non-transitory computer readable medium is described having stored thereon instructions, that when executed by one or more processors of a computing device, cause the computing device to perform functions. The functions comprise receiving, at the computing device, a vehicle data-signature-map of an interior of an aircraft for at least one parameter of the aircraft, and the vehicle data-signature-map is based on sensor outputs for the at least one parameter obtained during flight of the aircraft and received from sensors of mobile devices positioned at locations in the interior of the aircraft, and the vehicle data-signature-map is indicative of a distribution of the at least one parameter within the interior of the aircraft. The functions also include comparing the vehicle data-signature-map with a previous vehicle data-signature-map of the aircraft, and based on differences of the vehicle data-signature-map as compared to the previous vehicle data-signature-map, making a determination for maintenance of the aircraft. The functions also include generating and outputting, by the computing device, a recommendation for inspection of an identified portion of the aircraft based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

In still another example, a system for performing maintenance on an aircraft is described. The system comprises a computing device comprising one or more processors and a non-transitory computer readable medium having stored thereon instructions, that when executed by the one or more processors, cause the computing device to perform functions. The functions comprise receiving a vehicle data-signature-map of an interior of an aircraft for at least one parameter of the aircraft, and the vehicle data-signature-map is based on sensor outputs for the at least one parameter obtained during flight of the aircraft and received from sensors of mobile devices positioned at locations in the interior of the aircraft, and the vehicle data-signature-map is indicative of a distribution of the at least one parameter within the interior of the aircraft. The functions also include comparing the vehicle data-signature-map with a previous vehicle data-signature-map of the aircraft, and based on differences of the vehicle data-signature-map as compared to the previous vehicle data-signature-map, making a determination for maintenance of the aircraft. The functions also include generating and outputting a recommendation for inspection of an identified portion of the aircraft based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
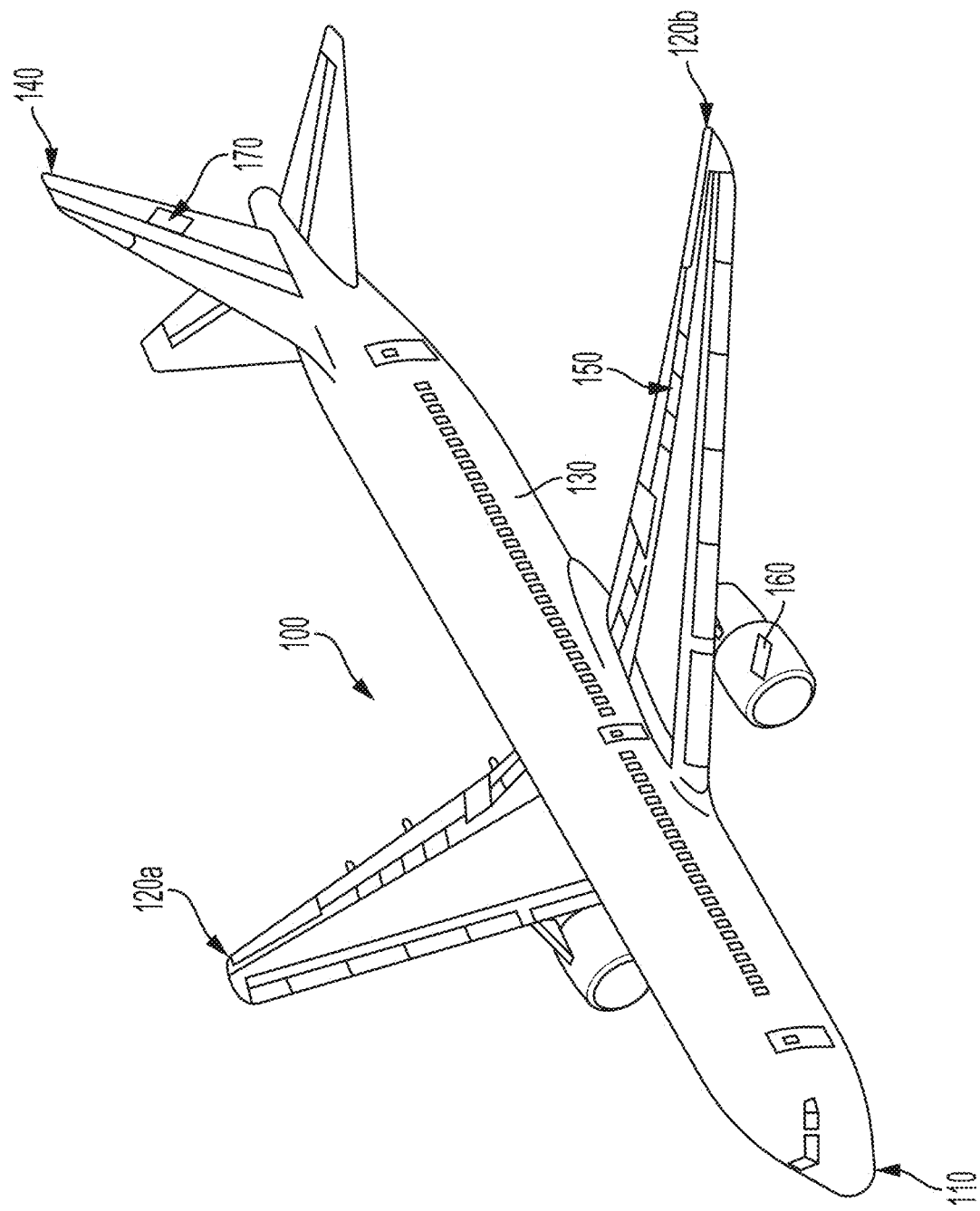
FIG. 1 illustrates an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods are described that enable aggregation of outputs from sensors collected during flight of an aircraft to create flight or vehicle data-signature-maps parameters of the flight and/or aircraft. Data-signature-maps can include or be representative of parameters such as vibration, audio/sound, or temperature. Value in the vehicle data-signature-maps are distributed across an interior of the aircraft cabin and can be compared against previous vehicle data-signature-maps for purposes of learning and offering advanced guidance to airline operators and maintainers, for example.

The systems and methods are very beneficial to remove problems of manual inspection of several thousand parameters to determine aircraft operation characteristics. In addition, creation and analysis of the vehicle data-signature-maps can improve passenger experience by optimizing conditions in the interior of the aircraft as a result of learning in real-time of the parameters, can optimize aircraft maintenance activities and turn-around due to knowledge of characteristics of the aircraft in flight, and generally provide a comprehensive set of data and meta data from real-time sensors during a flight-leg using airline supplied and passenger-provided mobile sensors.

The systems and methods can leverage an increasingly maturing sensor array that exist in mobile devices (e.g., tablets, mobile phones, smart watches), and software that enable dense mapping capability of the interior of the aircraft. An example method includes receiving outputs from a plurality of sensors positioned at fixed locations on an aircraft during a flight of the aircraft, receiving outputs from sensors of a plurality of mobile devices in an interior of the aircraft during the flight of the aircraft, mapping the outputs from the plurality of sensors and the outputs from the sensors of the plurality of mobile devices to a computer model of the aircraft for association with locations in the interior of the aircraft, and based on the mapping, creating a vehicle data-signature-map of the interior of the aircraft for at least one parameter of the aircraft.

Implementations of this disclosure provide technological improvements that are particular to computer technology, for example, those concerning analysis of large scale data and multiple sensor outputs. Computer-specific technological problems, such as evaluating sensor data for creation of vehicle signature-data-maps, can be wholly or partially solved by implementations of this disclosure. For example, implementation of this disclosure allows for output to be received from many different types of sensors and signature-data-maps to be created as a result of aggregation of the different sensor outputs. This is very beneficial to enable review and comparisons of the vehicle data-signature-maps per flight and per aircraft to provide further insight into maintenance due on the aircraft, waypoints flown, etc. that cannot be performed effectively without robust data collection. Implementations of this disclosure can thus introduce new and efficient improvements in the ways in which data is analyzed and used for making changes to aircraft and/or making changes to trajectories flown by the aircraft.

The systems and methods of the present disclosure further address problems particular to computer networks, for example, those concerning the processing of outputs of sensors including data received from various sensors at fixed location and data received from sensors at variable location. These computing network-specific issues can be solved by implementations of the present disclosure. For example, by mapping sensor outputs to specific interior locations of the aircraft, a distribution of a sensed parameter can be created to visualize the conditions of the parameter during flight at the specific locations. The implementations of the present disclosure thus introduce new and efficient improvements in the ways in which data can be received and analyzed such that new vehicle signature-data-maps can be created that give insight into conditions of the interior of the aircraft at a granular level (e.g., at each individual seat).

The vehicle signature-data-maps can be reviewed, and maintenance can be recommended more efficiently, and at reduced costs that enables service to be provided in greater amounts. The systems and methods also provide a cost avoidance that occurs today in a form of installation of more sensors on the aircraft by utilizing the sensors on mobile devices carried on the aircraft by passengers, for example.

Referring now to the figures, FIG. 1 illustrates an aircraft 100 that includes a nose 110, wings 120a-b, a fuselage 130, and a tail 140, according to an example implementation. The aircraft 100 also includes a plurality of sensors 150, 160, and 170 positioned on the aircraft 100, such as sensors on the wings 120a-b, a sensor on the engine, and/or a sensor on the tail 140. The aircraft 100 may include many more sensors (not shown) and positioned throughout the aircraft 100 either on exterior or interior components. The plurality of sensors 150, 160, and 170 may be positioned at fixed location on the aircraft 100, as shown in FIG. 1. In addition, or alternatively, the plurality of sensors 150, 160, and 170 can be positioned at variable locations such that the plurality of sensors 150, 160, and 170 are not positioned at permanent locations.

The plurality of sensors 150, 160, and 170 provide outputs, such as data or data words, providing respective information of the specific sensor. As an example, the sensor 150 positioned on the wing 120b may output data indicating a position of an aileron of the wing 120b (e.g., up/down). Other sensors may output data indicating air or ground speed, positions of control wheels, temperature of the engine, etc. The plurality of sensors 150, 160, and 170 thus output data indicative of conditions of the aircraft 100 in operation or during a flight of the aircraft 100, and also while on ground, for example. Outputs of the plurality of sensors 150, 160, and 170 can be analyzed to determine whether the aircraft 100 is operating as expected or may have maintenance due.

Figure 2:
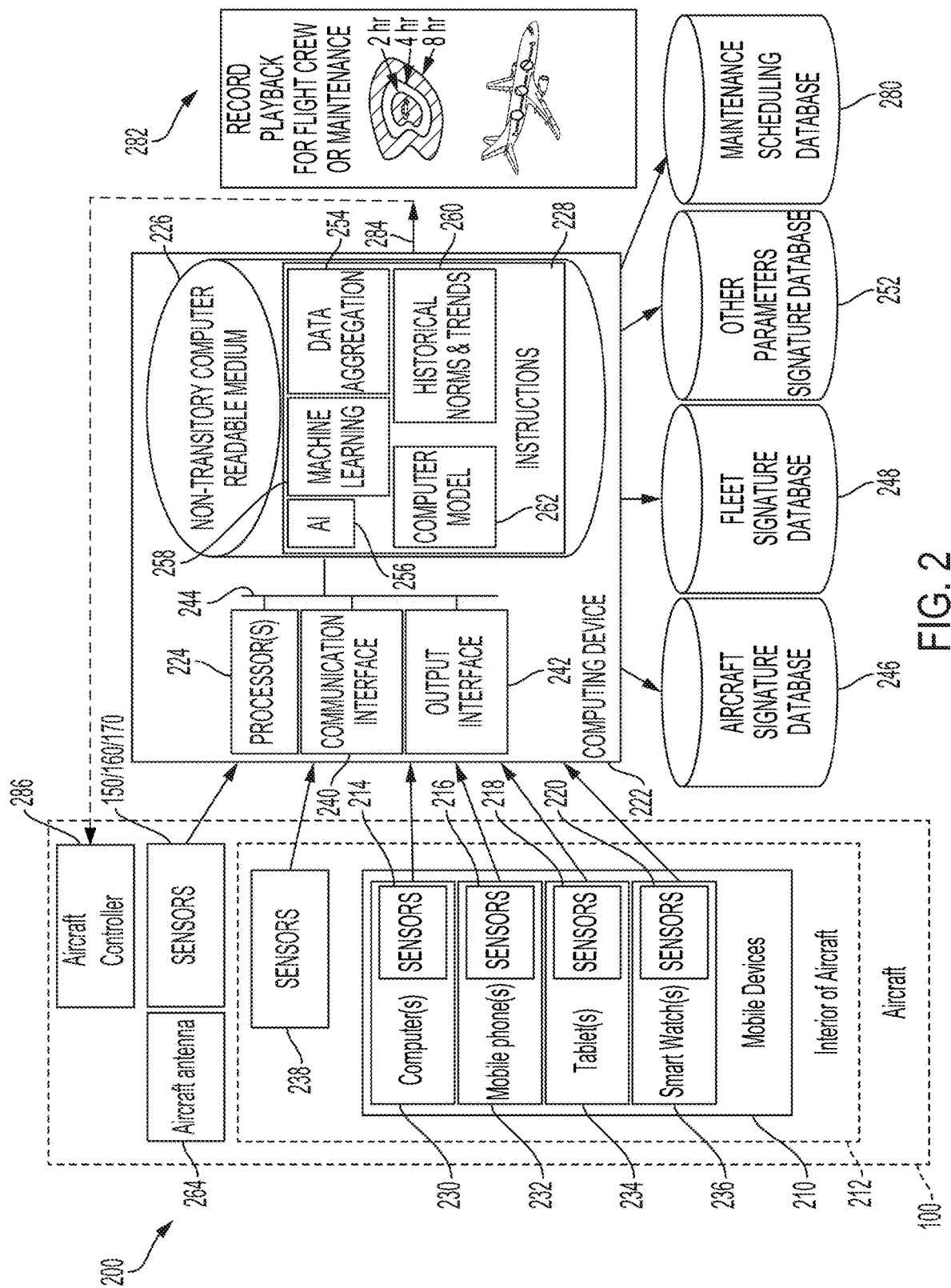
FIG. 2 illustrates a block diagram of an example of a real-time ad hoc network sensor system, according to an example implementation.

FIG. 2 illustrates a block diagram of an example of a real-time ad hoc network sensor system 200, according to an example implementation. The system 200 is shown to include components of the aircraft 100, although the aircraft 100 itself may not be a component of the system 200, and the aircraft 100 is illustrated in FIG. 2 for purposes to illustrate positions and locations of different components of the system 200.

Thus, the system 200 can be a stand-alone component separate from the aircraft 100, and the system 200 includes multiple elements, at least some of which may be located or positioned on or within the aircraft 100, for example. In some other examples, at least some of the components of the system 200 may be positioned in a ground-control system as well.

The system 200 includes the plurality of sensors 150, 160, and 170 positioned at fixed locations on the aircraft 100, a plurality of mobile devices 210 in an interior 212 of the aircraft 100, and the plurality of mobile devices 210 include sensors 214/216/218/220. The system 200 also includes a computing device 222 having one or more processors 224 and a non-transitory computer readable medium 226 having stored thereon instructions 228, that when executed by the one or more processors 224, cause the computing device 222 to perform functions. The functions include receiving outputs from the plurality of sensors 150, 160, and 170 during a flight of the aircraft 100, and receiving outputs from the sensors 214/216/218/220 of the plurality of mobile devices 210 during the flight of the aircraft 100, and the outputs from the sensors 214/216/218/220 of the plurality of mobile devices 210 are associated with a respective location of the plurality of mobile devices 210 in the interior 212 of the aircraft 100. The functions also include mapping the outputs from the plurality of sensors 150, 160, and 170 and the outputs from the sensors 214/216/218/220 of the plurality of mobile devices 210 to a computer model of the aircraft 100 for association with locations in the interior 212 of the aircraft 100, and based on mapping the outputs from the plurality of sensors 150, 160, and 170 and the outputs from the sensors 214/216/218/220 of the plurality of mobile devices 210 to the computer model of the aircraft 100, creating a vehicle data-signature-map of the interior 212 of the aircraft 100 for at least one parameter of the aircraft 100.

The plurality of sensors 150, 160, and 170 can be positioned at fixed locations on the aircraft 100, as shown in FIG. 1. In other examples, the plurality of sensors 150, 160, and 170 can be positioned at variable locations, such that a location of the plurality of sensors 150, 160, and 170 is not permanent.

Figure 3:
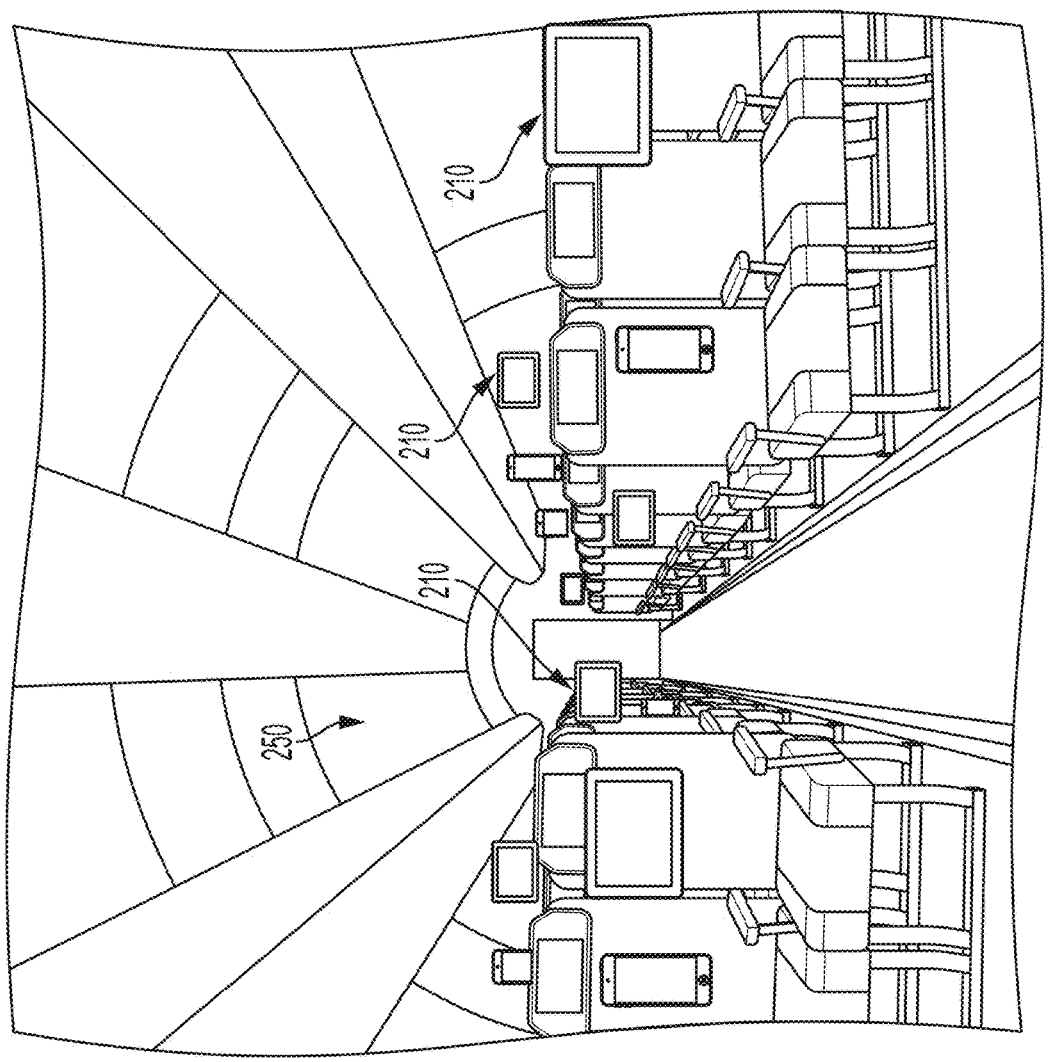
FIG. 3 illustrates an example of the interior of the aircraft including a passenger compartment, according to an example implementation.

The plurality of mobile devices 210 may include any number of mobile computing devices, such as a laptop computer 230 that includes the sensors 214, mobile phone(s) 232 that includes the sensors 216, a tablet computer 234 that includes the sensors 218, and smart watch(es) that includes the sensors 220. The plurality of mobile devices 210 may include airline-provided devices and/or passenger-owned mobile devices. As an example, FIG. 3 illustrates the interior 212 of the aircraft 100 including a passenger compartment 250, according to an example implementation. The passenger compartment 250 includes seating for passengers, and FIG. 3 illustrates various types of the plurality of mobile devices 210 including passenger-provided mobile devices located at individual seats.

Returning to FIG. 2, the sensors 214/216/218/220 may include any number of sensors per mobile device as well as many different types of sensors depending on the type of mobile device. Example sensors of the plurality of mobile devices 210 include, but are not limited to, an acceleration sensor, an ambient light or light sensor, an infrared sensor, a tilt sensor, a magnetometer sensor, a barometric pressure sensor, a gyroscope sensor, a global positioning system (GPS), a heart rate sensor, a pedometer sensor, a vibration sensor, an audio sensor, a temperature sensor, and a humidity sensor.

Thus, as shown in FIG. 2, the plurality of mobile devices 210 are located in the interior 212 of the aircraft 100, and the plurality of sensors 150, 160, and 170 are located in other areas of the aircraft 100. In other examples, however, additional sensors 238 similar to or equivalent as the plurality of sensors 150, 160, and 170 may be located in the interior 212 of the aircraft 100.

The computing device 222 may be located on-board the aircraft 100 or within a ground computing system as well. To perform the functions noted above, the computing device 222 includes a communication interface 240, an output interface 242, and each component of the computing device 222 is connected to a communication bus 244. The computing device 222 may also include hardware to enable communication within the computing device 222 and between the computing device 222 and other devices (not shown). The hardware may include transmitters, receivers, and antennas, for example.

The communication interface 240 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 240 may be configured to receive input data from one or more devices, and may also be configured to send output data to other devices.

The non-transitory computer readable medium 226 may include or take the form of memory, such as one or more computer-readable storage media that can be read or accessed by the one or more processors 224. The computer-readable storage media can include volatile and/or non-volatile storage components, such as optical, magnetic, organic or other memory or disc storage, which can be integrated in whole or in part with the one or more processors 224. The non-transitory computer readable medium 226 is considered non-transitory computer readable media. In some examples, the non-transitory computer readable medium 226 can be implemented using a single physical device (e.g., one optical, magnetic, organic or other memory or disc storage unit), while in other examples, the non-transitory computer readable medium 226 can be implemented using two or more physical devices.

The non-transitory computer readable medium 226 thus is a computer readable medium, and the instructions 228 are stored thereon. The instructions 228 include computer executable code.

The one or more processors 224 may be general-purpose processors or special purpose processors (e.g., digital signal processors, application specific integrated circuits, etc.). The one or more processors 224 may receive inputs from the communication interface 230 as well as outputs from other sensors (e.g., the plurality of sensors 150, 160, and 170 and the sensors 214/216/218/220), and process them to generate outputs that are stored in the non-transitory computer readable medium 226. The one or more processors 224 can be configured to execute the instructions 228 (e.g., computer-readable program instructions) that are stored in the non-transitory computer readable medium 226 and are executable to provide the functionality of the computing device 222 described herein.

The output interface 242 outputs information for reporting or storage, and thus, the output interface 242 may be similar to the communication interface 240 and can be a wireless interface (e.g., transmitter) or a wired interface as well.

The computing device 222 can also include or be coupled to a number of databases, or other storage devices, such as an aircraft signature database 246, a fleet signature database 248, and an other parameters signature database 252. In FIG. 2, the additional databases are shown as separate components of the computing device 222; however, each database may alternatively be integrated within the computing device

222. Access of the databases further enables the computing device 222 to perform at least some of the functions as described herein.

The aircraft signature database 246 includes information relating to the vehicle data-signature-map of the interior 212 of the aircraft 100. The vehicle data-signature-map may be for one parameter of the aircraft 100, or multiple parameters. In other examples, the aircraft signature database 246 stores many different vehicle data-signature-maps for all the different parameters. The different parameters may be based on types of information and data collected from the various sensors both interior and exterior of the aircraft 100. Examples of different parameters include temperature of the interior 212 of the aircraft 100 during flight, and the vehicle data-signature-map may include details showing a distribution of the temperature at specific locations in the interior 212 of the aircraft 100 at different times during the flight. The aircraft signature database 246 may store the vehicle data-signature-map of the aircraft 100 only, and not of other aircraft, for example. Reference to the aircraft signature database 246 can enable determination of a historical norm for a parameter of the aircraft 100, trends for the parameter of the aircraft 100, or a baseline for values of the parameter of the aircraft 100 within the interior of the aircraft 100.

The fleet signature database 248 stores vehicle data-signature-maps of many different aircraft all of which belong to the same fleet or are all of the same type. In this regard, the vehicle data-signature-maps in the fleet signature database 248 may all be for one specific commercial aircraft, but can include many different types of vehicle data-signature-maps for different parameters. In other examples, the fleet signature database 248 stores many different groupings of vehicle data-signature-maps for many different types of fleets as well. Reference to the fleet signature database 248 can enable determination of a historical norm for a parameter of aircraft in a fleet, trends for the parameter of aircraft in a fleet, or a baseline for values of the parameter of aircraft in a fleet.

The other parameters signature database 252 includes information that can be associated with the vehicle data-signature-maps, such as weather trends for flights, or customer profiles of the plurality of mobile devices 210 from which sensor outputs are provided.

Within one example, in operation, when the instructions 228 are executed by the one or more processors 224 of the computing device 222, the one or more processors 224 are caused to perform functions for aggregating outputs received from all sensors, creating the vehicle data-signature map of the aircraft 100, and analyzing the vehicle data-signature-map to provide useful results. The instructions 228 thus include a data aggregation rule set 254, artificial intelligence (AI) rule set 256, machine learning rule set 258, historical norms and trends rule set 260, and a computer model 262 of the aircraft 100.

The data aggregation rule set 254, when executed, enables the computing device 222 to receive the outputs from the plurality of sensors 150, 160, and 170 during a flight of the aircraft 100, and to receive the outputs from the sensors 214/216/218/220 of the plurality of mobile devices 210 during the flight of the aircraft 100. Thus, a real-time ad hoc network sensor system 200 is implemented. As used herein "real-time" refers to generation of the network during flight of the aircraft 100 on an ad hoc basis due to available sensors on-board the aircraft 100. The configuration of the system 200 will change from flight to flight depending on a number of passengers on-board, a type and a number of the plurality of mobile devices 210 on-board the aircraft 100, as well as whether a passenger opts-in to sharing data with the computing device 222, for example. In addition, "real-time" can refer to outputs from sensors being received by the computing device 222 during flight as the system 200 is created or after the system 200 is created.

In some examples, the plurality of sensors 150, 160, and 170 provide outputs on a regular basis, and the plurality of sensors 150, 160, and 170 are either hardwired to the computing device 222 or include wireless controllers to enable wireless communication with the computing device 222 to transmit the outputs to the computing device 222.

In addition, the plurality of mobile devices 210 include wireless controllers to enable wireless communication with the computing device 222 to transmit the outputs of the sensors 214/216/218/220 to the computing device 222. Prior to transmitting the outputs, in some examples, a user of the mobile device may first consent to the use of such data by the computing device 222. Thus, a user may be provided with controls allowing the user to make an election as to both if and when systems, programs, or features described herein may enable collection of user information or data output by the sensors 214/216/218/220. In addition, certain data may be treated in one or more ways before it is stored or used, so that personally identifiable information is removed. For example, a user's identity may be treated so that no personally identifiable information can be determined for the user, or a user's geographic location may be generalized where location information is obtained. Thus, the user may have control over what information is collected about the user or from the mobile device, how that information is used, and what information is provided to the user.

As such, in some examples, the computing device 222 may send a request to the plurality of mobile devices 210 prompting the plurality of mobile devices 210 with a request for permission to receive the outputs from the sensors 214/216/218/220 of the plurality of mobile devices 210, and based on receipt of permission from the plurality of mobile devices 210, the computing device 222 then may receive the outputs from the sensors 214/216/218/220 of the plurality of mobile devices 210 during the flight of the aircraft 100. In further examples, the users of the plurality of mobile devices 210 may download airline specific applications or software onto the plurality of mobile devices 210 that provide free entertainment in-flight systems, and by usage of the in-flight app, the user can agree to allow the computing device 222 to receive the outputs of the sensors 214/216/218/220.

After the outputs from all available sensors are received the computing device 222 then maps the outputs from the plurality of sensors 150, 160, and 170 and the outputs from the sensors 214/216/218/220 of the plurality of mobile devices 210 to a computer model 262 of the aircraft 100 for association with locations in the interior 212 of the aircraft 100. The computer model 262 of the aircraft 100 includes a computer-aided design (CAD) illustrating a layout of the interior 212 of the aircraft 100. Since the plurality of sensors 150, 160, and 170 are positioned at fixed locations on the aircraft 100, the fixed locations are known by the computing device. The outputs of the plurality of sensors 150, 160, and 170 include identifiers informing which sensor provided the output, and thus, the computing device 222 matches the output to the sensor, and the sensor to its fixed location. As a result, the outputs of the plurality of sensors 150, 160, and 170 can be mapped to the same fixed location that is illustrated in the computer model 262.

Similarly, the outputs from the sensors 214/216/218/220 of the plurality of mobile devices 210 are associated with a respective location of the plurality of mobile devices 210 in the interior 212 of the aircraft 100, and the computing device 222 uses those locations to map the sensor data to a specific position or area of the interior 212 of the aircraft 100. In some examples, the outputs may include information indicating the respective location. For instance, the plurality of mobile devices 210 may include location determination capabilities (global positioning system (GPS), WiFi access point location services, etc.), and thus, the plurality of mobile devices 210 can determine a location and include the location with data sent to the computing device 222 that includes outputs of the sensors 214/219/218/220.

In another example, the aircraft 100 includes an aircraft antenna 264, which may be a WiFi access point for example. The computing device 222 may receive, from the plurality of mobile devices 210, data indicative of a distance of the plurality of mobile devices 210 from the aircraft antenna 264, and then determines, based on the data indicative of the distance from the aircraft antenna 264, the respective location of the plurality of mobile devices 210 in the interior 212 of the aircraft 100. The computing device 222 may have data indicating a fixed location of the aircraft antenna 264, and once a distance from it is known (e.g., 20 feet), due to the narrow nature of the fuselage 130, the respective location of the plurality of mobile devices 210 can be determined to a level of granularity as required. The level of granularity can include determining a row number as the location, for example.

In yet another example, the computing device 222 may receive, from the plurality of mobile devices 210, user identifier information in response to a user logging into an account, and then can associate the user identifier information (e.g., a frequent flyer number) with a seat assignment in the aircraft 100 based on ticketing information so as to use the seat assignment as the respective location for the plurality of mobile devices 210.

Once the computing device 222 receives or determines the location information of the plurality of mobile devices 210, the computing device 222 maps the outputs from the sensors 214/216/218/220 of the plurality of mobile devices 210 to the computer model 262 of the aircraft 100. Following, the vehicle data-signature-map of the interior 212 of the aircraft 100 is created for at least one parameter of the aircraft 100. The parameters of the aircraft 100 can be based on types of sensors providing outputs. As some examples, the vehicle data-signature-map can be created for at least one of an acceleration, an ambient light, an infrared, a tilt, a magnetometer, a barometric pressure, a gyroscope, a global positioning system (GPS), a heart rate sensor, a pedometer, a vibration, an audio, a temperature, and a humidity of a portion of the aircraft 100 where the data was collected. The vehicle data-signature-map is indicative of a distribution of the at least one parameter within the interior 212 of the aircraft 100.

Figure 4:
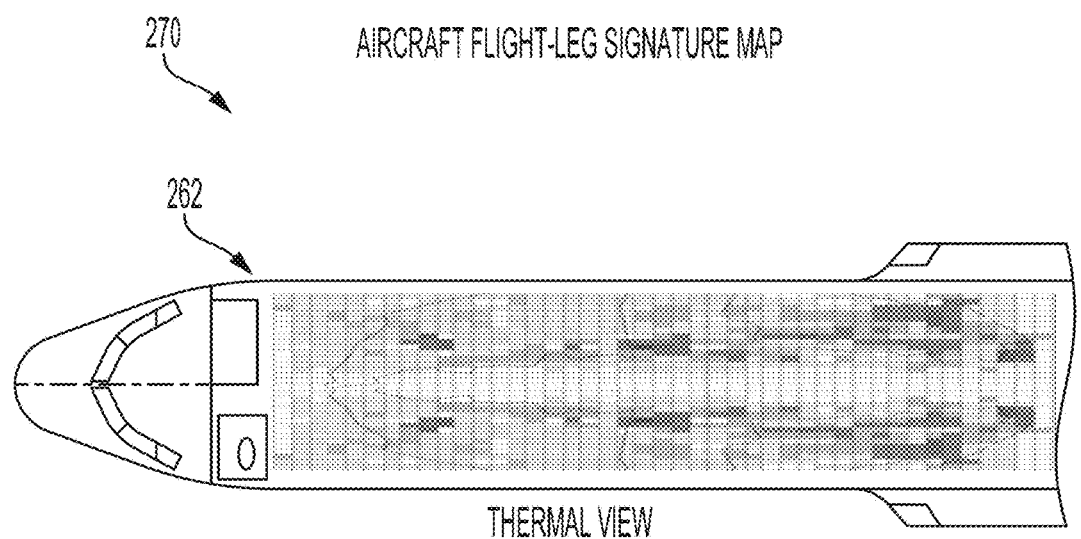
FIG. 4 is an example of one representation of a vehicle data-signature-map, according to an example implementation.

FIG. 4 is an example of one representation of a vehicle data-signature-map 270, according to an example implementation. In FIG. 4, the computer model 262 of the aircraft 100 is shown along with features of the interior 212 of the aircraft 100. The vehicle data-signature-map 270 is shown as a heat map in which color or shading is used to illustrate different values of the parameter within the interior 212 of the aircraft 100. In FIG. 4, the parameter is temperature, and lighter shading may indicate colder temperatures versus darker shading that indicates warmer temperatures.

Figure 5:
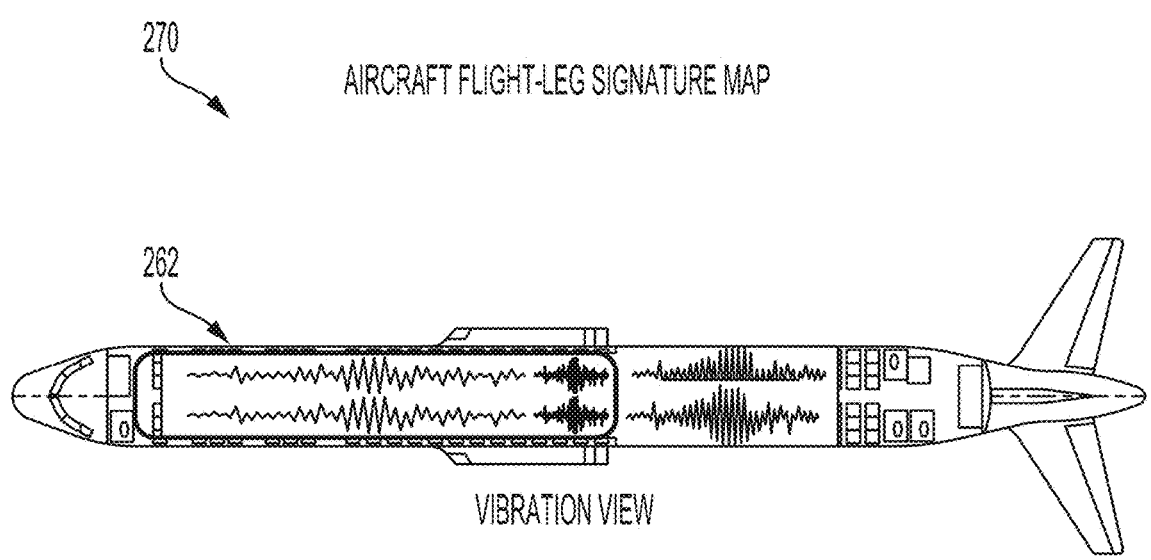
FIG. 5 is another example of one representation of the vehicle data-signature-map, according to an example implementation.

FIG. 5 is another example of one representation of the vehicle data-signature-map 270, according to an example implementation. In FIG. 5, the parameter is acceleration so as to provide details of vibration experienced by the passenger. Again, lighter shading may indicate lower vibration levels versus darker shading that indicates higher vibration levels. In addition, further graphics (e.g., graphical waveforms) are included to provide relative comparison of vibration experienced so as to illustrate the distribution of the vibration within the interior 212 of the aircraft 100.

Within examples, the computing device 222 may over sample outputs of sensors to create a more complete data set over multiple occurrences of various aircrafts or over multiple flights. Some data received may not be as accurate as other data, for example, if a sensor on a mobile device is not working properly or is poorly calibrated. In other instances, some flights may have a fewer number of mobile devices on board (or a fewer number of passengers carrying mobile devices), or perhaps a fewer number of mobile devices that are active. Thus, in some instances, there may be a minimum amount of outputs needed to create the vehicle data-signature-map. By aggregating outputs of sensors over multiple flights, a growing set of data can be accumulated to provide a more robust vehicle data-signature-map.

In one example, the computing device 222 receives outputs from sensors of additional mobile devices during a subsequent flight of the aircraft 100, and the additional mobile devices are located in the interior 212 of the aircraft 100 and are associated with a respective location of the additional mobile devices in the interior 212 of the aircraft 100. The computing device 222 then aggregates the outputs from the sensors 214/216/218/220 of the plurality of mobile devices 210 during the flight of the aircraft 100 with the outputs from the sensors of the additional mobile devices during the subsequent flight of the aircraft 100 based on the respective location of the plurality of mobile devices 210 and the respective location of the additional mobile devices in the interior 212 of the aircraft 100. Based on aggregating the outputs from the sensors 214/216/218/220 of the plurality of mobile devices 210 during the flight of the aircraft 100 with the outputs from the sensors of the additional mobile devices during the subsequent flight of the aircraft 100, the computing device 222 creates the vehicle data-signature-map of the interior 212 of the aircraft 100 for the at least one parameter of the aircraft 100. In this example, the outputs of sensors are collected during flights performed by the same aircraft, so that the vehicle data-signature-map represents conditions on-board the same aircraft even though data is collected over a subsequent flight which is not necessarily the same flight path; however, the same aircraft is used.

In another example, the computing device 222 receives outputs from sensors of additional mobile devices during multiple subsequent flights of the aircraft, and the additional mobile devices are located in the interior 212 of the aircraft 100 and are associated with a respective location of the additional mobile devices in the interior 212 of the aircraft 100. Then, based on a number of (i) the outputs from the sensors 214/216/218/220 of the plurality of mobile devices 210 during the flight of the aircraft 100 and (ii) the outputs from the sensors of the additional mobile devices during the multiple subsequent flights of the aircraft 100 exceeding a threshold, the computing device 222 creates the vehicle data-signature-map of the interior 212 of the aircraft 100 for the at least one parameter of the aircraft 100 using all received outputs. In this example, the computing device 222 may create the vehicle data-signature-map once a threshold amount of data has been received for the same aircraft 100, such as at least fifty data points, one hundred data points, or more depending on the parameter being analyzed. For smaller aircraft, multiple flights may be required to reach the threshold number due to a fewer amount of passengers on board. Requiring a threshold amount of data prior to creating the vehicle data-signature-map ensures that a robust vehicle data-signature-map will be created without any false positives influencing the map too largely.

In still another example, the computing device 222 may receive outputs from sensors of additional mobile devices during a flight of a second aircraft, and the additional mobile devices are located in the interior of the second aircraft and are associated with a respective location of the additional mobile devices in the interior of the second aircraft. Furthermore, the second aircraft is a same type of aircraft as the first aircraft, but is not the same aircraft. Then, the computing device 222 aggregate the outputs from the sensors 214/216/218/220 of the plurality of mobile devices 210 during the flight of the first aircraft with the outputs from the sensors of the additional mobile devices during the flight of the second aircraft based on the respective location of the plurality of mobile devices and the respective location of the additional mobile devices in the interior of the first aircraft and the second aircraft. Further, based on aggregating the outputs from the sensors 214/216/218/220 of the plurality of mobile devices 210 during the flight of the first aircraft with the outputs from the sensors of the additional mobile devices during the flight of the second aircraft, the computing device 222 creates the vehicle data-signature-map of the interior of the aircraft as representative for a fleet of the aircraft 100. In this example, data from multiple different aircraft, but of the same type and model, is aggregated. This enables creation of the vehicle data-signature-map for the fleet.

The outputs from the plurality of sensors 150, 160, and 170 during the flight of the aircraft 100 and the outputs from the sensors 214/216/28/220 of the plurality of mobile devices 210 during the flight of the aircraft 100 are each associated with a timestamp (e.g., related to time collected), and based on mapping the outputs from the plurality of sensors 150, 160, and 170 and the outputs from the sensors 214/216/218/220 of the plurality of mobile devices 210 to the computer model 262 of the aircraft 100, the computing device 222 create the vehicle data-signature-map 270 of the interior 212 of the aircraft 100 for the at least one parameter for a flight-leg of the flight for the aircraft 100. The flight-leg is associated with the timestamp. In this manner, the different conditions experienced by passengers can be further associated with the operating conditions of the flight-leg to give more insight as to whether the condition in the interior 212 of the aircraft 100 are normal or abnormal.

Further types of data can also be associated the vehicle data-signature-map. For example, the computing device 222 can further collect weather information for the flight of the aircraft 100, and associate the weather information with the vehicle data-signature-map. As another example, the computing device 222 can further collect waypoints and altitude information for the flight of the aircraft 100, and associate the waypoints and altitude information with the vehicle data-signature-map.

The vehicle data-signature-maps offer many uses, some of which include use within data analysis to compare against previous signatures for the purpose of learning and offering advanced guidance to airline operators and maintainers. Thus, within examples, the computing device 222 can compare the vehicle data-signature-map with a previous vehicle data-signature-map of the aircraft 100, as retrieved from the aircraft signature database 246, and based on differences of the vehicle data-signature-map as compared to the previous vehicle data-signature-map, the computing device can identify anomalies of the aircraft 100 or of the flight. Further, the AI rule set 256 and the machine learning rule set 258 can be used to process the vehicle data-signature-map in order to make a recommendation on maintenance or changes to operation of the aircraft 100. As an example, when the temperature vehicle data-signature-map indicates an area of the aircraft is colder/warmer that observed in the past for a portion of the aircraft 100, the recommendation provided can indicate to provide maintenance on the environmental system for that specific portion of the aircraft 100. The vehicle data-signature maps can also be compared to the fleet signature maps, as retrieved from the fleet signature database 248, for example, to determine how the aircraft 100 is operating as compared to other aircraft in the fleet.

The data-signatures of all of the aircraft signature database 246, the fleet signature database 248, and the other parameters signature database 252 can be retrieved to enable the computing device 222 to perform an analysis sorted by fleet, aircraft type, configuration, weather, geography, time of day, etc., and offer recommendations on maintenance schedules, routes that had issues, etc.

As a specific example, in a scenario where a comparison of the vehicle data-signature-map to maps found in the aircraft signature database 246 indicate that a particular aircraft has experienced an increase in temperature in the interior 212 of the aircraft 100 that is abnormal, this may lead to a recommendation to perform maintenance on the environmental system. However, a further comparison of the vehicle data-signature-map to the maps and data in the other parameters signature database 252 may indicate that the aircraft 100 was rerouted to Phoenix, and thus, the associated waypoints and weather information is factored into the analysis to determine that the increase in temperature is normal so as to filter out and avoid false positives. Thus, all databases can be accessed to perform a full robust analysis of the vehicle data-signature-map in order to generate a recommendation for maintenance, if needed.

Figure 6:
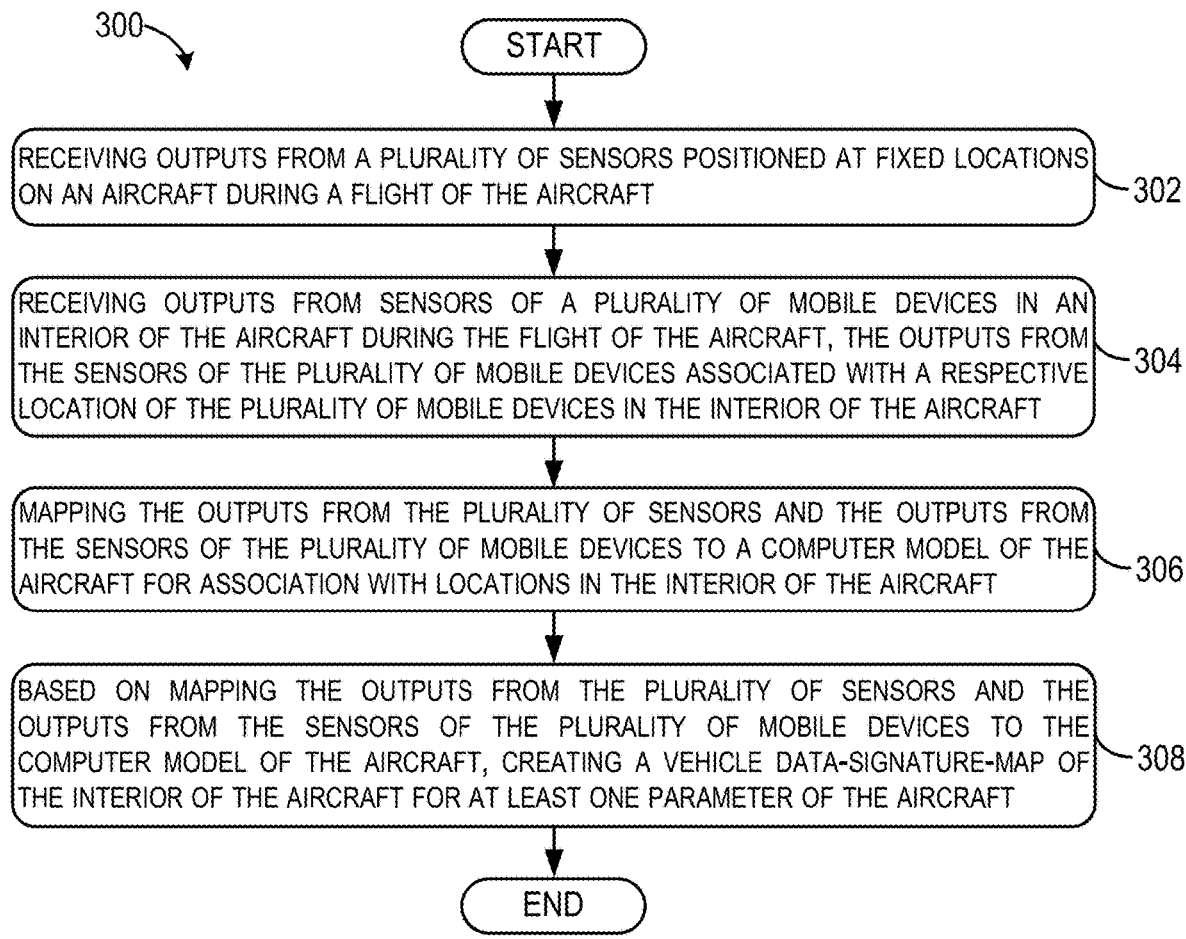
FIG. 6 shows a flowchart of another example of a method for data parameter reasonability analysis, according to an example implementation.

FIG. 6 shows a flowchart of another example of a method 300 for data parameter reasonability analysis, according to an example implementation. Method 300 shown in FIG. 6 presents an example of a method that could be used with the aircraft 100 shown in FIG. 1, with the system 200 shown in FIG. 2, or with the computing device 222 shown in FIG. 2, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes receiving outputs from the plurality of sensors 150, 160, and 170 positioned at fixed locations on the aircraft 100 during a flight of the aircraft 100. At block 304, the method 300 includes receiving outputs from sensors 214/216/218/220 of the plurality of mobile devices 210 in the interior 212 of the aircraft 100 during the flight of the aircraft 100, and the outputs from the sensors 214/216/218/220 of the plurality of mobile devices 210 associated with a respective location of the plurality of mobile devices 210 in the interior 212 of the aircraft 100. At block 306, the method 300 includes mapping the outputs from the plurality of sensors 150, 160, and 170 and the outputs from the sensors 214/216/218/220 of the plurality of mobile devices 210 to a computer model 262 of the aircraft 100 for association with locations in the interior 212 of the aircraft 100. At block 308, the method 300 includes based on mapping the outputs from the plurality of sensors 150, 160, and 170 and the outputs from the sensors 214/216/218/220 of the plurality of mobile devices 210 to the computer model 262 of the aircraft 100, creating a vehicle data-signature-map of the interior 212 of the aircraft 100 for at least one parameter of the aircraft 100.

Figure 7:
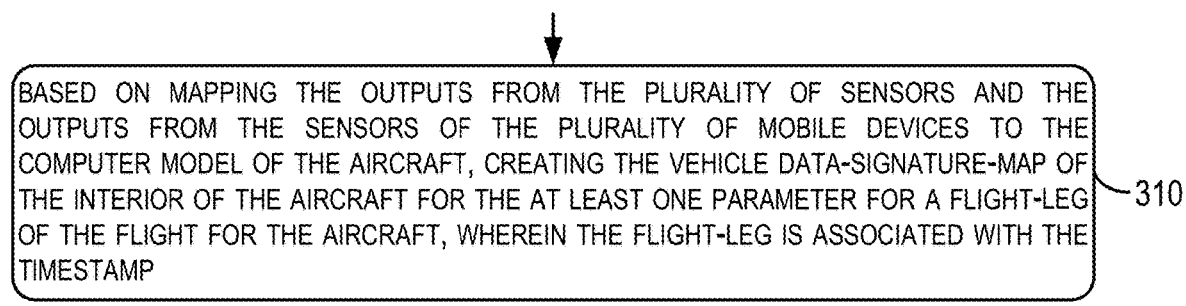
FIG. 7 shows a flowchart of an example for use with the method in FIG. 6, according to an example implementation.

FIG. 7 shows a flowchart of an example for use with the method 300 in FIG. 6, according to an example implementation. In an example in which the outputs from the plurality of sensors 150, 160, and 170 during the flight of the aircraft 100 and the outputs from the sensors 214/216/218/220 of the plurality of mobile devices 210 during the flight of the aircraft 100 are each associated with a timestamp, at block 310, functions include based on mapping the outputs from the plurality of sensors 150, 160, and 170 and the outputs from the sensors 214/216/218/220 of the plurality of mobile devices 210 to the computer model 262 of the aircraft 100, creating the vehicle data-signature-map of the interior 212 of the aircraft 100 for the at least one parameter for a flight-leg of the flight for the aircraft 100, and the flight-leg is associated with the timestamp.

Figure 8:
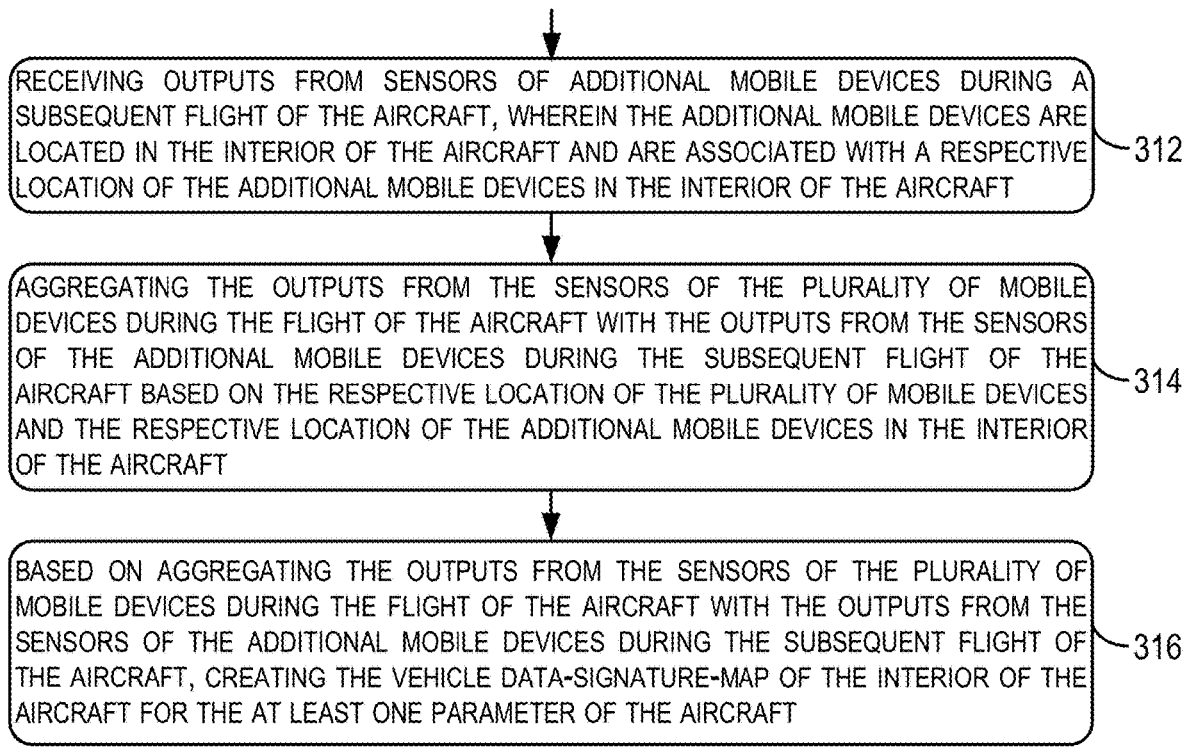
FIG. 8 shows a flowchart of another example for use with the method in FIG. 6, according to an example implementation.

FIG. 8 shows a flowchart of another example for use with the method 300 in FIG. 6, according to an example implementation. At block 312, functions include receiving outputs from sensors of additional mobile devices during a subsequent flight of the aircraft, and the additional mobile devices are located in the interior 212 of the aircraft 100 and are associated with a respective location of the additional mobile devices in the interior 212 of the aircraft 100. At block 314, functions include aggregating the outputs from the sensors of the plurality of mobile devices during the flight of the aircraft with the outputs from the sensors of the additional mobile devices during the subsequent flight of the aircraft based on the respective location of the plurality of mobile devices and the respective location of the additional mobile devices in the interior 212 of the aircraft 100. At block 316, functions include based on aggregating the outputs from the sensors of the plurality of mobile devices during the flight of the aircraft 100 with the outputs from the sensors of the additional mobile devices during the subsequent flight of the aircraft 100, creating the vehicle data-signature-map of the interior 212 of the aircraft 100 for the at least one parameter of the aircraft 100.

Figure 9:
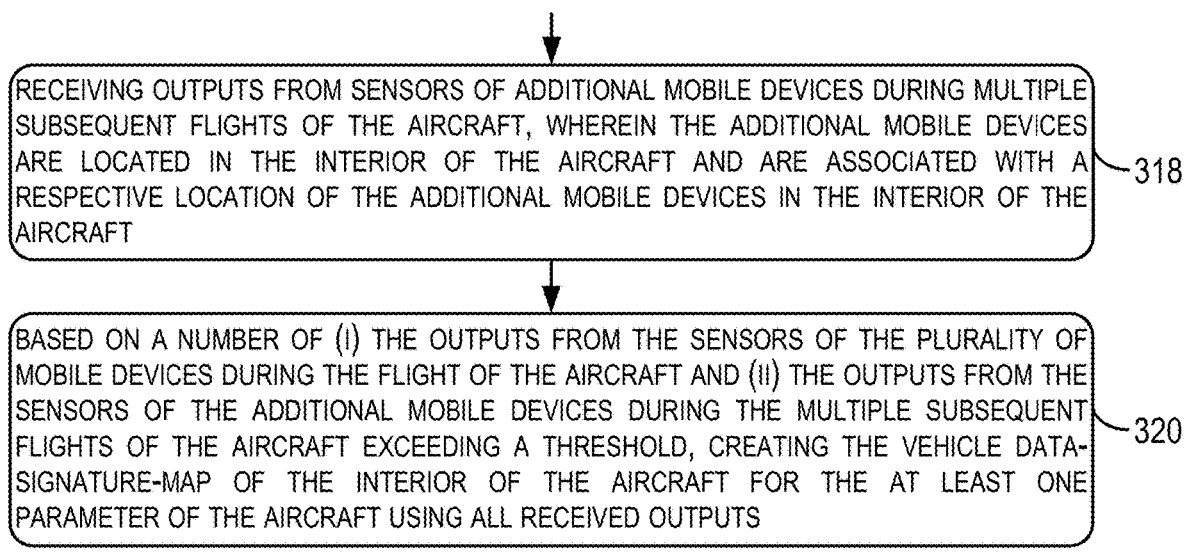
FIG. 9 shows a flowchart of another example for use with the method in FIG. 6, according to an example implementation.

FIG. 9 shows a flowchart of another example for use with the method 300 in FIG. 6, according to an example implementation. At block 318, functions include receiving outputs from sensors of additional mobile devices during multiple subsequent flights of the aircraft 100, and the additional mobile devices are located in the interior 212 of the aircraft 100 and are associated with a respective location of the additional mobile devices in the interior 212 of the aircraft 100. At block 320, functions include based on a number of (i) the outputs from the sensors of the plurality of mobile devices during the flight of the aircraft 100 and (ii) the outputs from the sensors of the additional mobile devices during the multiple subsequent flights of the aircraft 100 exceeding a threshold, creating the vehicle data-signature-map of the interior 212 of the aircraft 100 for the at least one parameter of the aircraft using all received outputs.

The vehicle data-signature-maps thus enable comparisons to be performed with data in the aircraft signature database 246, the fleet signature database 248, and the other parameters signature database 252 to identify differences of the sampled data to a normal signature. The comparisons can be used to create real-time in-flight notifications to flight crew of any issues (e.g., temperature values outside of a normal range, noise signatures that match to known areas of concern, vibration pattern in an area defined by aircraft manufacturer outside of known range, etc.). Some notifications can be acted on by the flight crew in-flight, such as adjusting temperature of the fuselage 130. Other notifications can be used by the pilots to adjust the manner in which the aircraft 100 is flown, for example.

In other examples, the computing device 222 may be within a ground-station and analyzes the vehicle data-signature-maps for condition-based maintenance recommendations. For example, the vehicle data-signature-maps can be utilized to prioritize unscheduled aircraft inspections or maintenance due to observations seen and can offer advanced guidance to airline operators and maintainers.

Figures 10, 11:
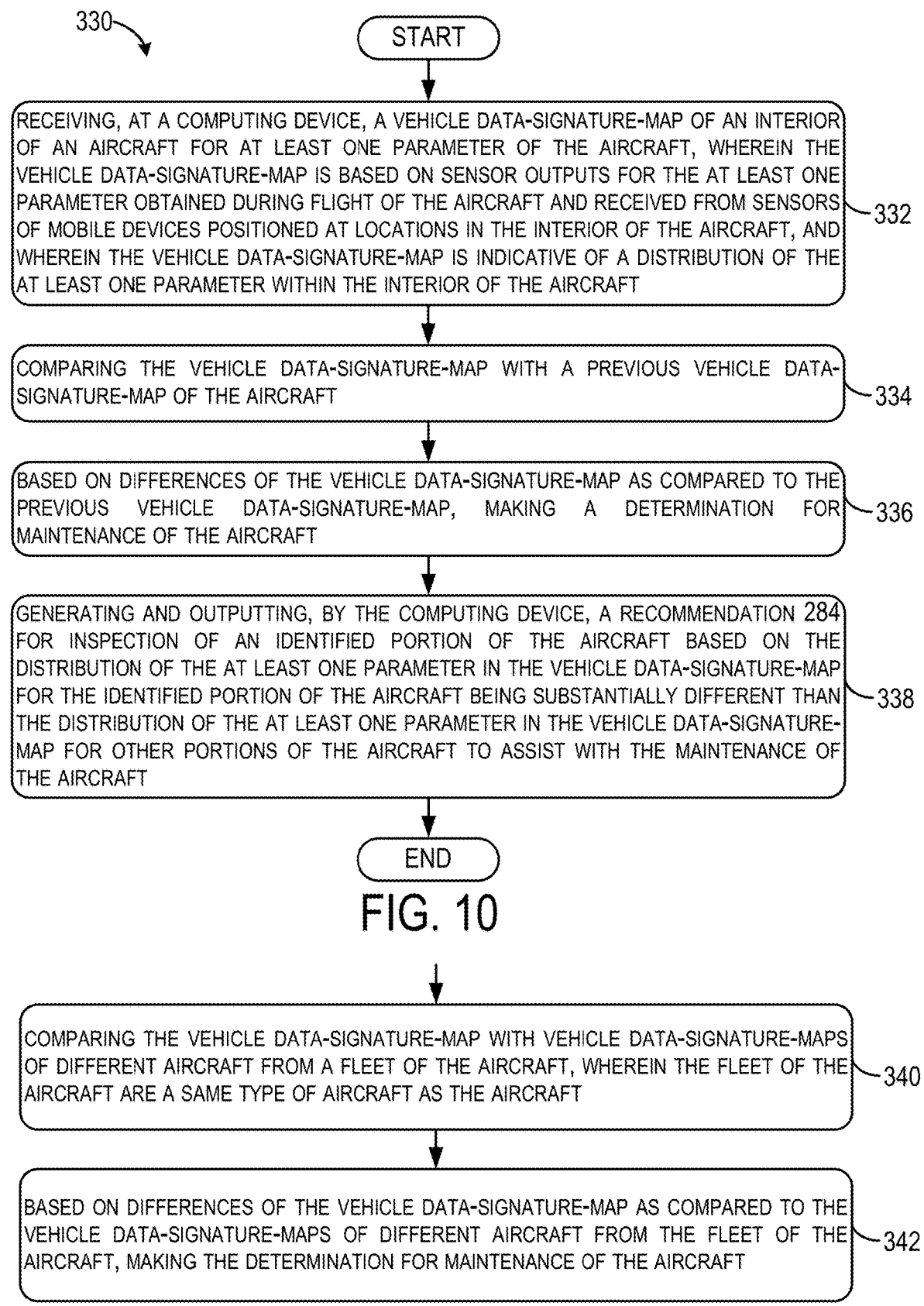
FIG. 10 shows a flowchart of another example of a method of performing maintenance on the aircraft 100, according to an example implementation.
FIG. 11 shows a flowchart of another example for use with the method in FIG. 10, according to an example implementation.

FIG. 10 shows a flowchart of another example of a method 330 of performing maintenance on the aircraft 100, according to an example implementation. Method 330 shown in FIG. 10 presents an example of a method that could be used with the aircraft 100 shown in FIG. 1, with the system 200 shown in FIG. 2, or with the computing device 222 shown in FIG. 2, for example. Further, devices or systems may be used or configured to perform logical functions presented in FIG. 10. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 330 may include one or more operations, functions, or actions as illustrated by one or more of blocks 332-338. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. Further, each block or portions of each block in FIG. 10 (and for all method flowcharts described herein) may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture.

At block 332, the method 300 includes receiving, at the computing device 222, a vehicle data-signature-map of the interior 212 of the aircraft 100 for at least one parameter of the aircraft 100, and the vehicle data-signature-map is based on sensor outputs for the at least one parameter obtained during flight of the aircraft 100 and received from the sensors 214/216/218/220 of the mobile devices 210 positioned at locations in the interior 212 of the aircraft 100. The vehicle data-signature-map is indicative of a distribution of the at least one parameter within the interior 212 of the aircraft 100.

At block 334, the method 300 includes comparing the vehicle data-signature-map with a previous vehicle data-signature-map of the aircraft 100. The computing device 222 can retrieve the previous vehicle data-signature-map of the aircraft 100 from the aircraft signature database 246.

At block 336, the method 300 includes based on differences of the vehicle data-signature-map as compared to the previous vehicle data-signature-map, making a determination for maintenance 282 of the aircraft 100. As shown in FIG. 2, the determination for the maintenance 282 can be a notification to the flight crew, for example. Differences can include minor or major differences. For example, difference thresholds may be set for different parameters that would trigger the determination for maintenance. For temperature, when a difference is more than five degrees Fahrenheit for a particular portion of the aircraft 100, for example, that can trigger the determination for maintenance being needed. The thresholds may be obtained from the aircraft manufacturer as to normal operating conditions of the aircraft 100.

At block 338, the method 300 includes generating and outputting, by the computing device, a recommendation 284 for inspection of an identified portion of the aircraft 100 based on the distribution of the at least one parameter in the vehicle data-signature-map for the identified portion of the aircraft 100 being substantially different than the distribution of the at least one parameter in the vehicle data-signature-map for other portions of the aircraft 100 to assist with the maintenance of the aircraft 100. For example, for a temperature parameter, when temperature observed in the vehicle data-signature-map is much lower or higher in one area as compared to other areas in the aircraft 100, that can trigger the recommendation 284 to indicate an inspection of the one specific area. The vehicle data-signature-map may indicate that one row in the interior 212 of the aircraft 100 has a substantially different temperature than all other rows. In this regard, substantially different may be a threshold amount, such as +/−five degrees Fahrenheit. Substantially different can be based on thresholds set by the manufacturer for normal operating conditions, and can add tolerances to the threshold values as well.

In some examples, referring to FIG. 2, the computing device 222 may access a maintenance scheduling database 280 to access a schedule for maintenance of the aircraft 100. The computing device 222 can compare the recommendation 284 for inspection to the schedule to determine if the recommendation 284 is following the recommended schedule. In instances where the recommendation is for maintenance not on the schedule, and this occurs a number of times, the machine learning rule set 258 can be executed to modify or optimize the maintenance schedule for the aircraft 100.

FIG. 11 shows a flowchart of another example for use with the method 330 in FIG. 10, according to an example implementation. At block 340, functions include comparing the vehicle data-signature-map with vehicle data-signature-maps of different aircraft from a fleet of the aircraft 100, and the fleet of the aircraft are a same type of aircraft as the aircraft 100. At block 342, functions include making the determination for maintenance of the aircraft 100 based on differences of the vehicle data-signature-map as compared to the vehicle data-signature-maps of different aircraft from the fleet of the aircraft. Referring to FIG. 2, the computing device 222 can access vehicle data-signature-maps of different aircraft from a fleet of the aircraft 100 from the fleet signature database 248. These vehicle data-signature-maps can be from a same model of the aircraft 100 or can be from models of aircraft that fly along the same or similar traffic routes or airports, for example. As a specific example, for temperatures, when an interior of an aircraft is observed at 87° F. in Phoenix, Ariz. (USA), and an interior of another aircraft is observed at 77° F. in Phoenix, Ariz. (USA) at a same time, there may be an issue with air conditioning in one of the aircraft. The comparative analysis of the vehicle data-signature-maps enables the recommendation 284 to be made for maintenance.

Figure 12:
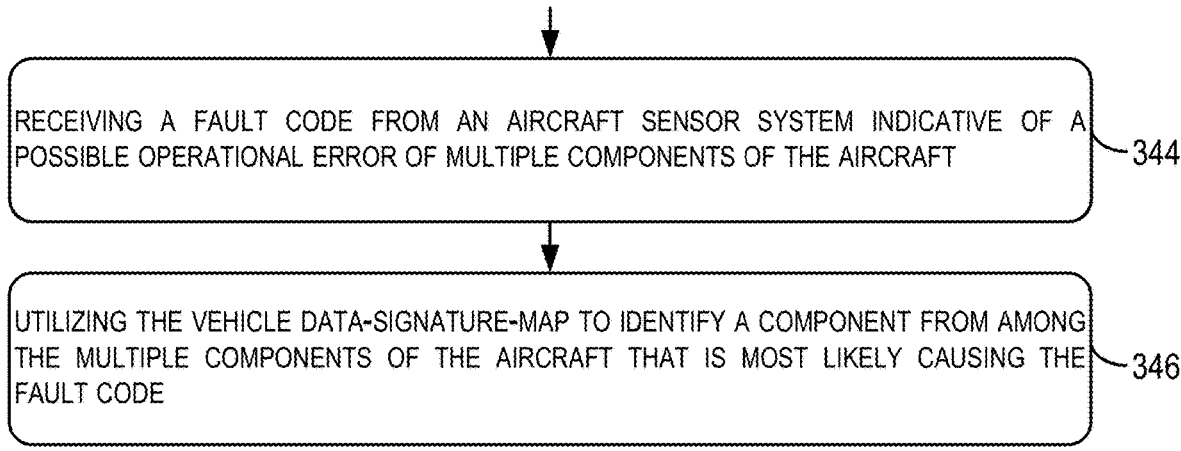
FIG. 12 shows a flowchart of another example for use with the method in FIG. 10, according to an example implementation.

FIG. 12 shows a flowchart of another example for use with the method 330 in FIG. 10, according to an example implementation. At block 344, functions include receiving a fault code from an aircraft sensor system, e.g., the sensors 238, indicative of a possible operational error of multiple components of the aircraft 100, and at block 346 functions include generating the recommendation for inspection of the identified portion of the aircraft by utilizing the vehicle data-signature-map to identify a component from among the multiple components of the aircraft 100 that is most likely causing the fault code. In this example, the fault code may indicate that the air conditioning system in general has an error. Utilizing the vehicle data-signature-map with respect to temperature may be useful to analyze thermal distribution within the interior 212 of the aircraft 100 to narrow down the inspection area to a few specific rows based on temperatures observed in those rows (from sampled data) be substantially different than temperatures observed in other rows. This can reduce aircraft maintenance turnaround time through calibration of maintenance fault codes and readings from dynamic sensors in the fuselage 130.

Figure 13:
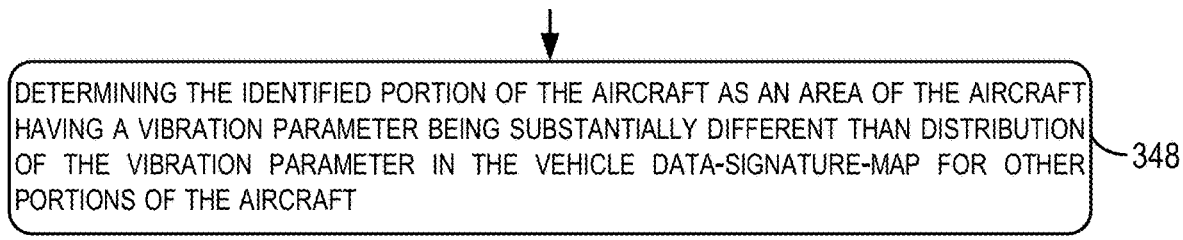
FIG. 13 shows a flowchart of another example for use with the method in FIG. 10, according to an example implementation.

FIG. 13 shows a flowchart of another example for use with the method 330 in FIG. 10, according to an example implementation. In one example, the parameter of the aircraft 100 is indicative of turbulence of the aircraft 100 during the flight and the vehicle data-signature-map indicates a distribution of vibration of the aircraft 100. In this example, at block 348, functions include determining the identified portion of the aircraft 100 as an area of the aircraft 100 having a vibration parameter being substantially different than distribution of the vibration parameter in the vehicle data-signature-map for other portions of the aircraft 100. Such functions can be useful, for instance, to identify seats that may require maintenance due to larger vibrations being detected in those areas.

Figure 14:
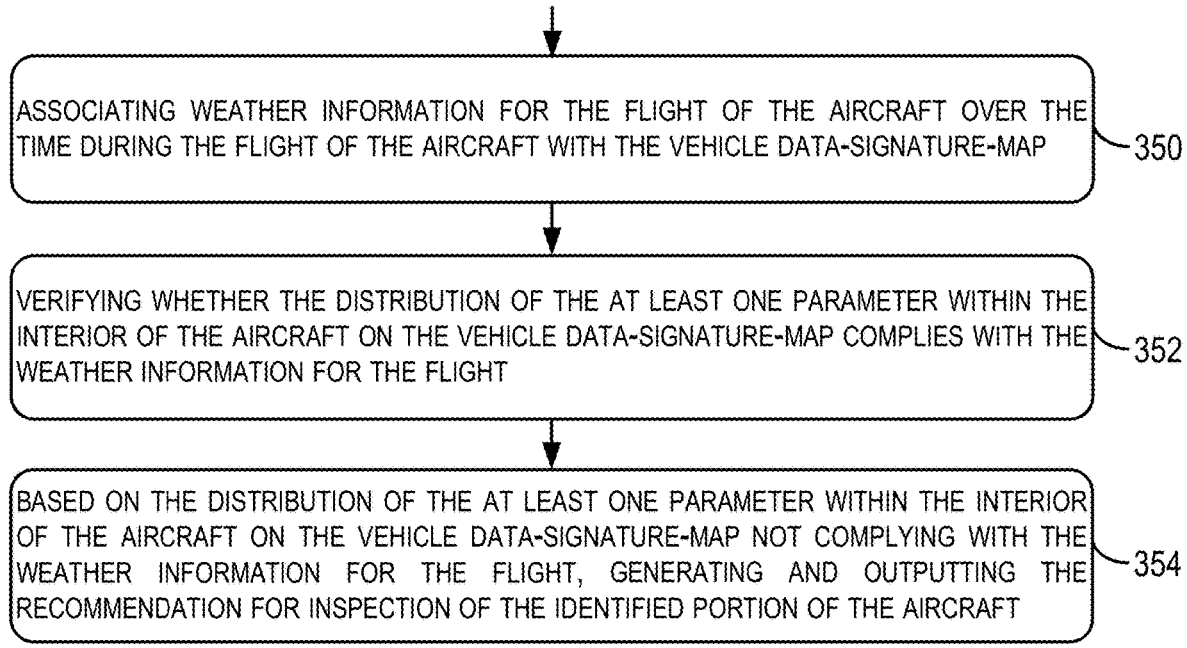
FIG. 14 shows a flowchart of another example for use with the method in FIG. 10, according to an example implementation.

FIG. 14 shows a flowchart of another example for use with the method 330 in FIG. 10, according to an example implementation. In some examples, the vehicle data-signature-map is indicative of the distribution of the at least one parameter within the interior 212 of the aircraft 100 over time during the flight of the aircraft 100. In these examples, at block 350, functions include associating weather information for the flight of the aircraft 100 over the time during the flight of the aircraft 100 with the vehicle data-signature-map. The computing device 222 can do so by accessing the weather information in the other parameters signature database 252. At block 352, functions include verifying whether the distribution of the at least one parameter within the interior 212 of the aircraft 100 on the vehicle data-signature-map complies with the weather information for the flight. At block 354, functions include based on the distribution of the at least one parameter within the interior 212 of the aircraft 100 on the vehicle data-signature-map not complying with the weather information for the flight, generating and outputting the recommendation for inspection of the identified portion of the aircraft 100. In this example, when the weather may be the cause of higher vibrations/turbulence experienced instead of an issue with the aircraft 100, the weather information can be analyzed in addition to the vehicle data-signature-map. However, even in certain weather conditions, when the vehicle data-signature-map has a distribution of vibration, for example, representative of an area of the aircraft 100 experiencing a higher vibration (comparative to other areas), then the recommendation for inspection can be generated.

Figure 15:
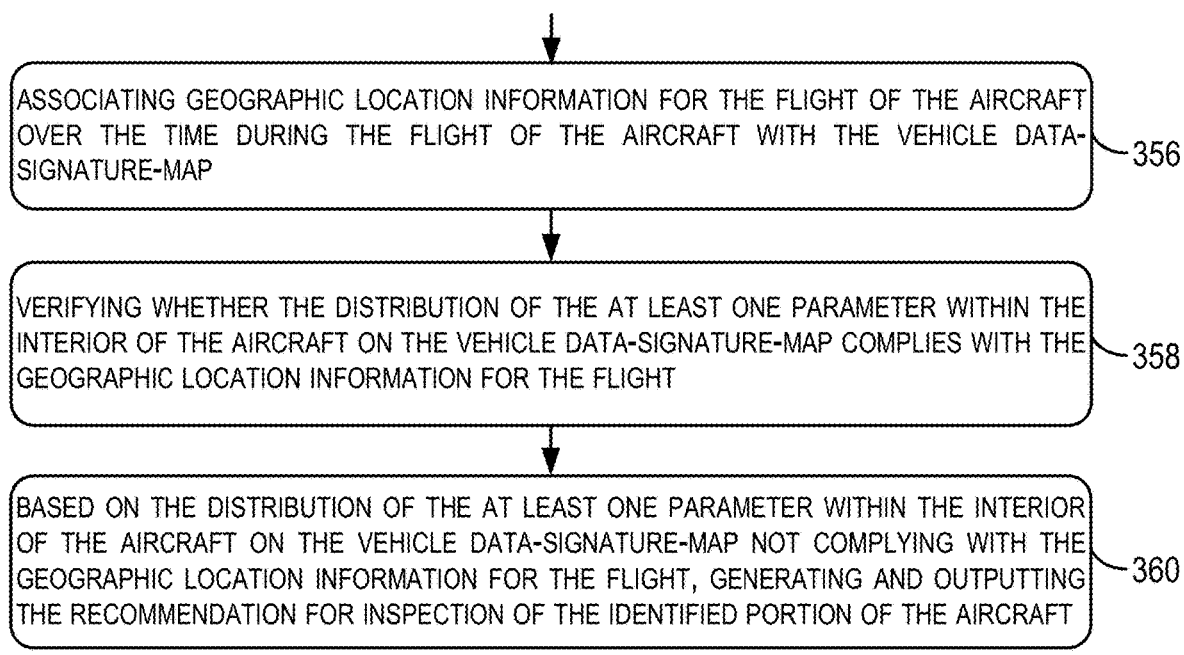
FIG. 15 shows a flowchart of another example for use with the method in FIG. 10, according to an example implementation.

FIG. 15 shows a flowchart of another example for use with the method 330 in FIG. 10, according to an example implementation. In some examples, the vehicle data-signature-map is indicative of the distribution of the at least one parameter within the interior 212 of the aircraft 100 over time during the flight of the aircraft 100, and at block 356, functions include associating geographic location information for the flight of the aircraft 100 over the time during the flight of the aircraft 100 with the vehicle data-signature-map. At block 358, functions include verifying whether the distribution of the at least one parameter within the interior of the aircraft 100 on the vehicle data-signature-map complies with the geographic location information for the flight, and at block 360, functions include based on the distribution of the at least one parameter within the interior 212 of the aircraft 100 on the vehicle data-signature-map not complying with the geographic location information for the flight, generating and outputting the recommendation for inspection of the identified portion of the aircraft 100.

Associating the geographic location with the vehicle data-signature-map during the flight enables further false positives to be identified. As an example, for temperature parameters, when the flight lands in an area with increased temperature it would be appropriate to see a surge in temperature distribution on the vehicle data-signature-map. As a result, combining geographic and weather data with the vehicle data-signature-map can enable further advanced data analysis when making the recommendations for inspection of the aircraft 100.

Figure 16:
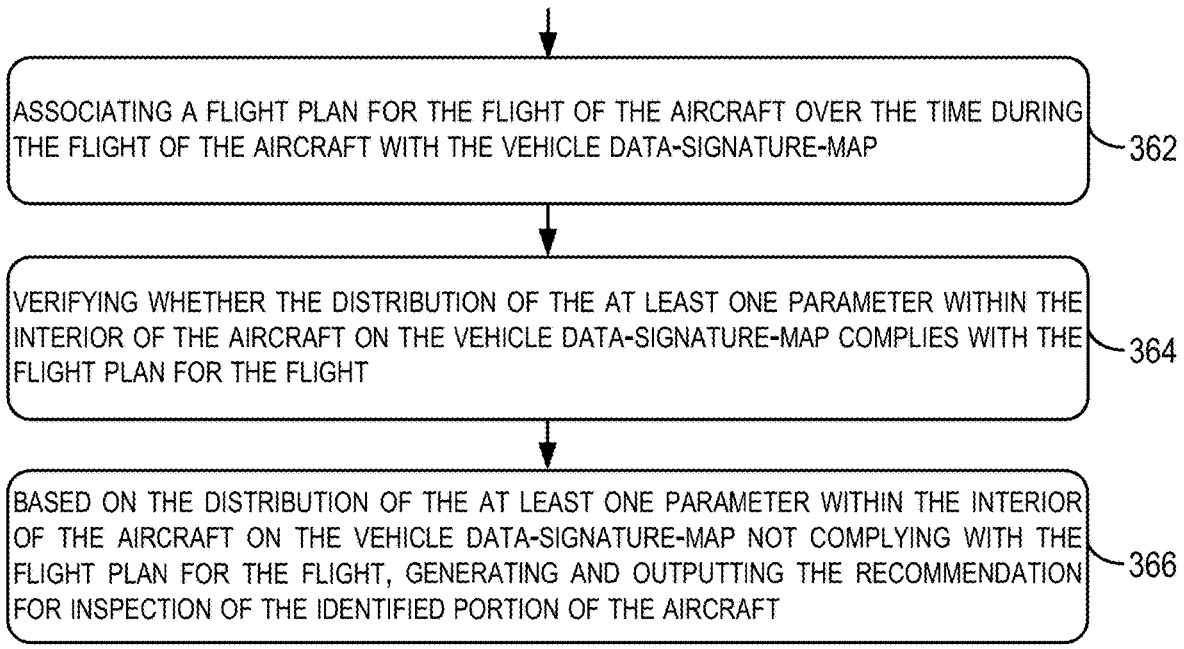
FIG. 16 shows a flowchart of another example for use with the method in FIG. 10, according to an example implementation.

FIG. 16 shows a flowchart of another example for use with the method 330 in FIG. 10, according to an example implementation. In this further example, at block 362, functions include associating a flight plan for the flight of the aircraft 100 over the time during the flight of the aircraft 100 with the vehicle data-signature-map. At block 364, functions include verifying whether the distribution of the at least one parameter within the interior 212 of the aircraft 100 on the vehicle data-signature-map complies with the flight plan for the flight, and at block 366, functions include based on the distribution of the at least one parameter within the interior 212 of the aircraft 100 on the vehicle data-signature-map not complying with the flight plan for the flight, generating and outputting the recommendation for inspection of the identified portion of the aircraft 100. Similar to above, in an example where the flight plan takes the flight to areas of warmer temperatures, it can be expected to see increases in the temperature distribution of the vehicle data-signature-map. Thus, the geographic location, weather, flight plans, time of day, and other factors can all be considered when evaluating the vehicle data-signature-map.

Figure 17:
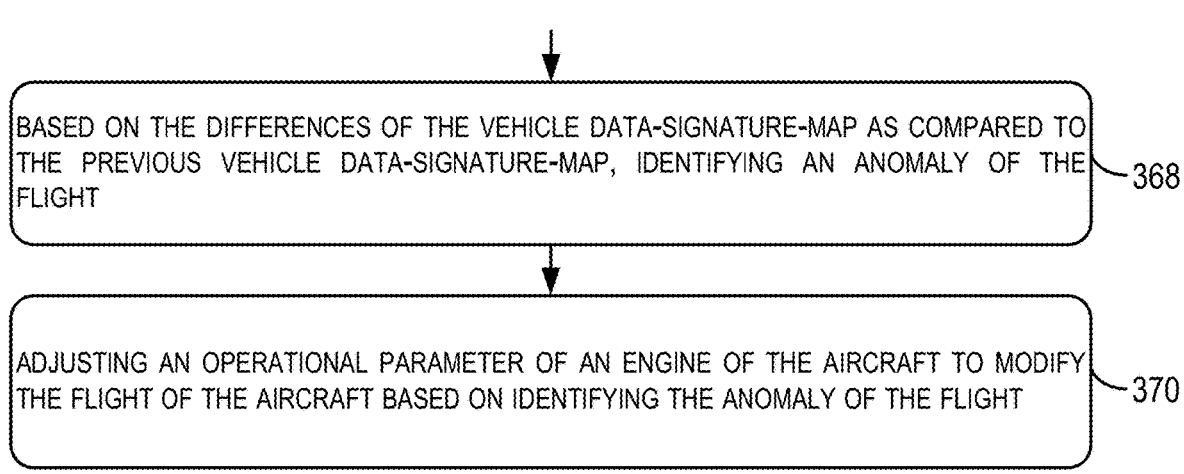
FIG. 17 shows a flowchart of another example for use with the method in FIG. 10, according to an example implementation.

FIG. 17 shows a flowchart of another example for use with the method 330 in FIG. 10, according to an example implementation. In some examples, the vehicle data-signature-map is received in real time during the flight of the aircraft 100. In such examples, at block 368, functions include based on the differences of the vehicle data-signature-map as compared to the previous vehicle data-signature-map, identifying an anomaly of the flight, and at block 370, functions include adjusting an operational parameter of an engine of the aircraft 100 to modify the flight of the aircraft 100 based on identifying the anomaly of the flight. In one instance, an operational parameter of the engine includes speed, and the speed can be adjusted when vibration parameters on the vehicle data-signature-map appear higher than previously experienced. Thus, the last n-number of flight trends can be leveraged and used for comparison to provide recommendations to the flight crew or pilot of likely causes of signature anomalies.

Referring back to FIG. 2, the aircraft 100 may further include an aircraft controller 286 (e.g., computing device with processor and memory) that can receive the recommendation 284 and make an adjustment to an operational parameter of the aircraft 100 in real-time during the flight. In other examples, the flight crew or pilot can view the recommendation 284 on a display or other playback mechanism and may make such adjustments as deemed necessary.

Figure 18:
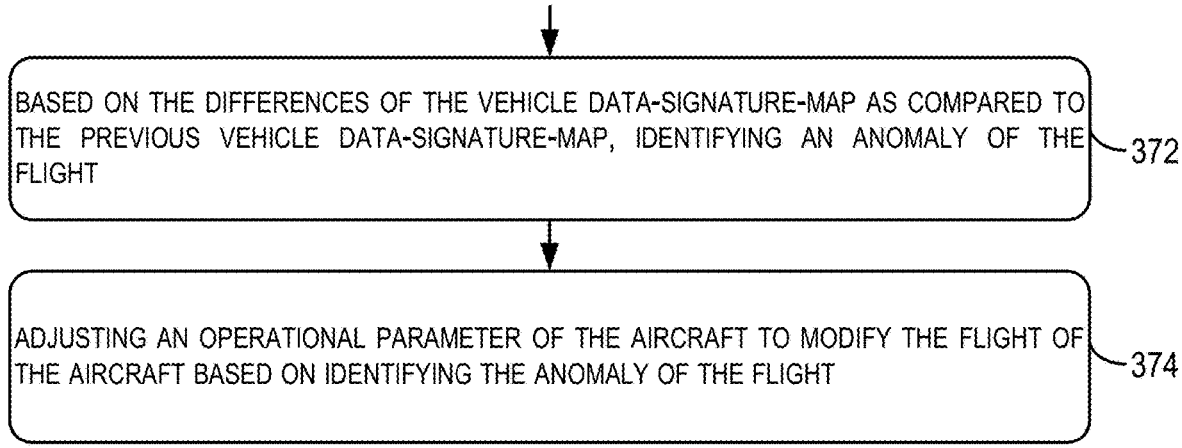
FIG. 18 shows a flowchart of another example for use with the method in FIG. 10, according to an example implementation.

FIG. 18 shows a flowchart of another example for use with the method 330 in FIG. 10, according to an example implementation. At block 372, functions include based on the differences of the vehicle data-signature-map as compared to the previous vehicle data-signature-map, identifying an anomaly of the flight. At block 374, functions include adjusting an operational parameter of the aircraft 100 to modify the flight of the aircraft 100 based on identifying the anomaly of the flight. Here, an anomaly of the flight may be any parameter, and one example includes temperature of the fuselage 130. When the temperature parameters on the vehicle data-signature-map appear higher than previously experienced, the flight crew can adjust the temperature accordingly.

Figure 19:
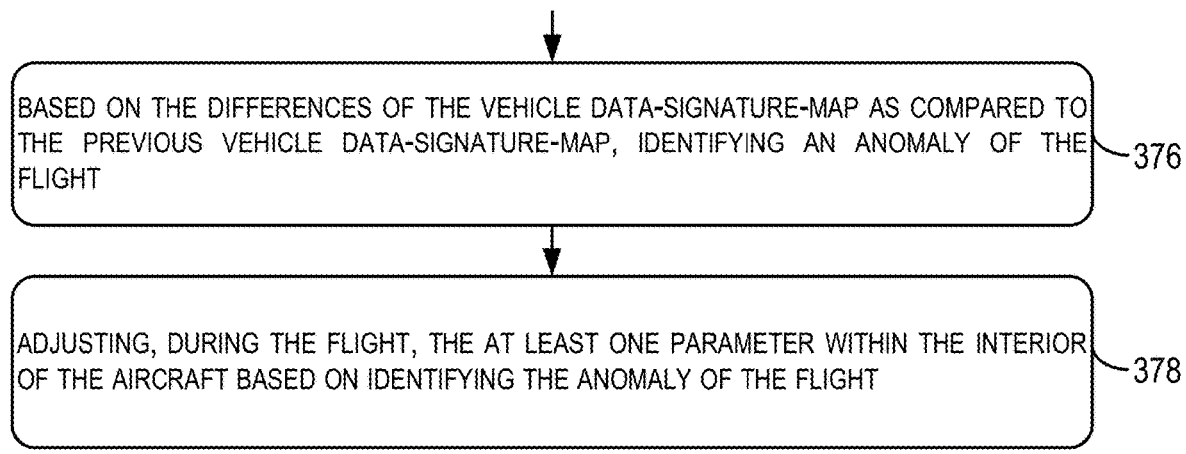
FIG. 19 shows a flowchart of another example for use with the method in FIG. 10, according to an example implementation.

FIG. 19 shows a flowchart of another example for use with the method 330 in FIG. 10, according to an example implementation. At block 376, functions include based on the differences of the vehicle data-signature-map as compared to the previous vehicle data-signature-map, identifying an anomaly of the flight. At block 378, functions include adjusting, during the flight, the at least one parameter within the interior of the aircraft 100 based on identifying the anomaly of the flight.

Thus, the operational parameters can be adjusting during the flight, in real-time. In other examples, operational parameter settings can be adjusted within a ground control computer such that the adjusted settings may be used for future flights.

Figure 20:
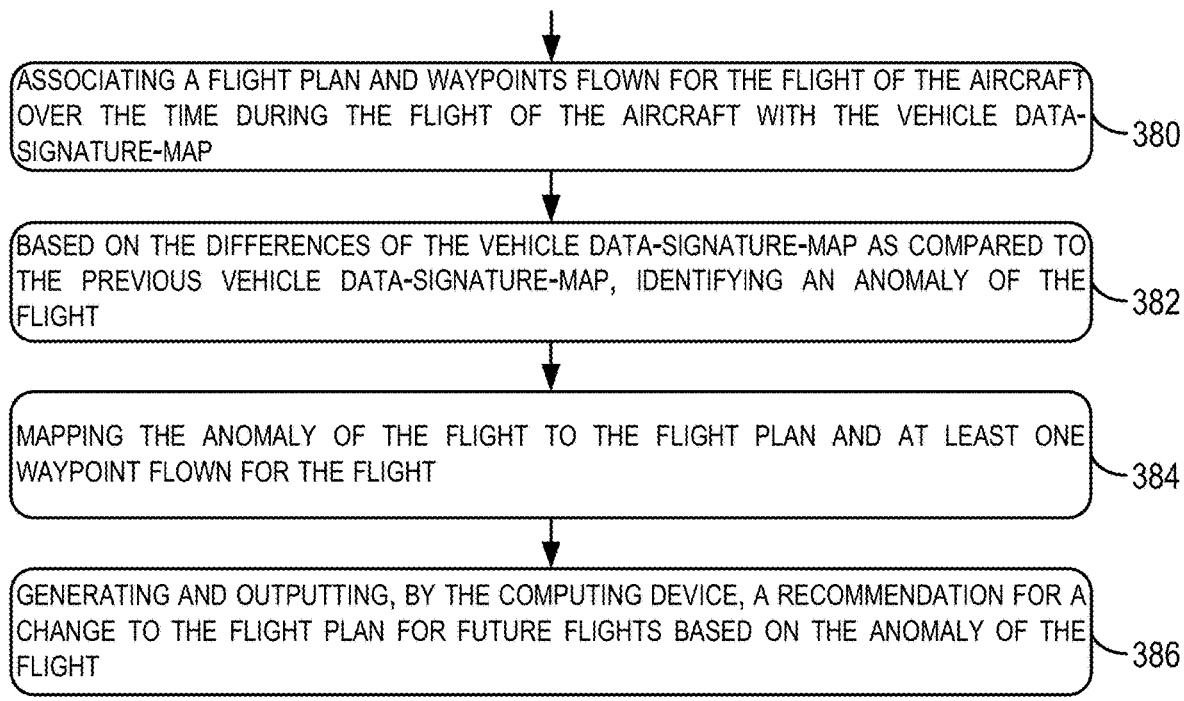
FIG. 20 shows a flowchart of another example for use with the method in FIG. 10, according to an example implementation.

FIG. 20 shows a flowchart of another example for use with the method 330 in FIG. 10, according to an example implementation. At block 380, functions include associating a flight plan and waypoints flown for the flight of the aircraft 100 over the time during the flight of the aircraft 100 with the vehicle data-signature-map, and at block 382 functions include based on the differences of the vehicle data-signature-map as compared to the previous vehicle data-signature-map, identifying an anomaly of the flight. At block 384, functions include mapping the anomaly of the flight to the flight plan and at least one waypoint flown for the flight, and at block 386 functions include generating and outputting, by the computing device 222, a recommendation for a change to the flight plan for future flights based on the anomaly of the flight. In this example, it can be determined that the flight path may be the cause of some anomaly of the flight, such as high winds or weather related conditions more likely to occur in one geographic area, and thus, when the vehicle data-signature-maps indicate anomalies, changes to the flight plans can be recommended.

Figure 21:
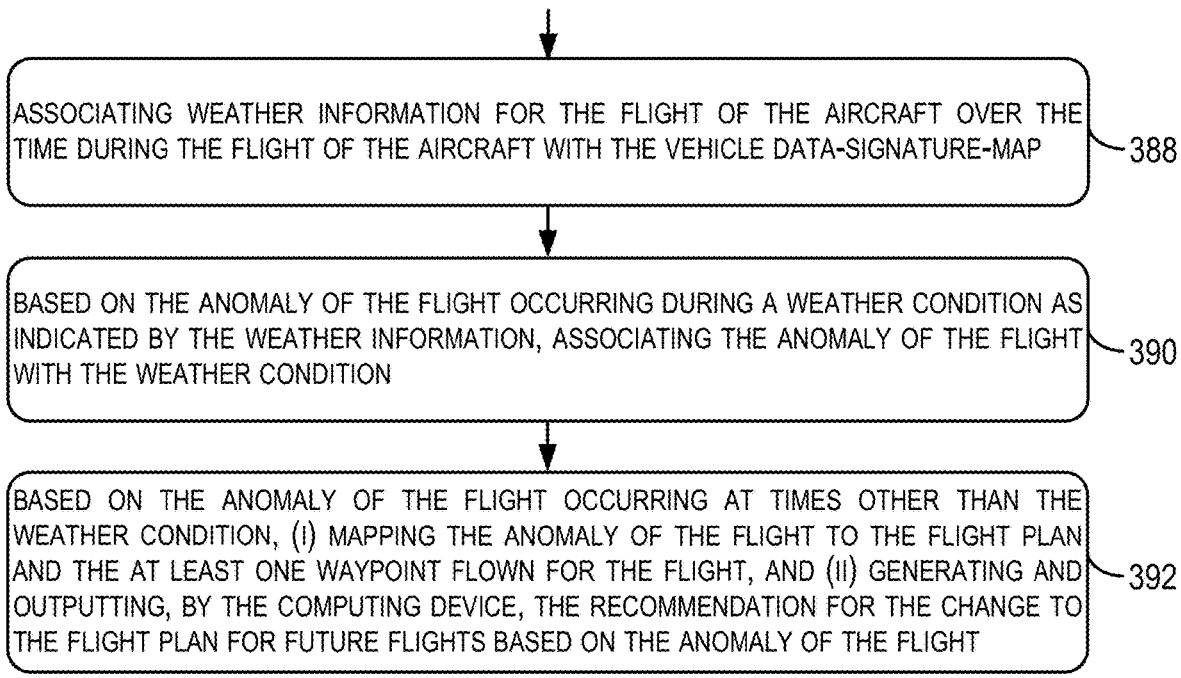
FIG. 21 shows a flowchart of another example for use with the method in FIG. 10, according to an example implementation.

FIG. 21 shows a flowchart of another example for use with the method 330 in FIG. 10, according to an example implementation. At block 388, functions include associating weather information for the flight of the aircraft 100 over the time during the flight of the aircraft 100 with the vehicle data-signature-map, and at block 390 functions include based on the anomaly of the flight occurring during a weather condition as indicated by the weather information, associating the anomaly of the flight with the weather condition. At block 392, functions include based on the anomaly of the flight occurring at times other than the weather condition, (i) mapping the anomaly of the flight to the flight plan and the at least one waypoint flown for the flight, and (ii) generating and outputting, by the computing device 222, the recommendation for the change to the flight plan for future flights based on the anomaly of the flight. Thus, the weather information can again be incorporated to rule out weather as the cause of the anomaly seen in the distribution of the parameter of the vehicle data-signature-maps.

Using examples of the methods and systems described herein avoids the need to refurbish existing aircraft with additional sensors that could provide a complete distribution of sensors as well as a complete set of different types of sensors throughout the fuselage where the passengers are located. With passenger provided mobile devices, many sensors are brought on-board the aircraft, and the mobile devices are addressable and provide outputs on an as requested basis either in flight or afterwards, and the outputs are collected from specific portions of the aircraft to provide a granular view of the conditions at that portion of the interior of the aircraft.

Collecting this type of data over a number of flights enables a statistical sample to be created for analysis to determine how the interior of the aircraft is behaving as compared to what has been seen in the past or on different aircraft. Use of the example method sand systems can thus lead to improvements in passenger comfort and safety, guide maintenance to improve turnaround time, and help to further evaluate operation of the aircraft.

Note that although this disclosure has described use of the methods and systems for use on aircraft, the same functions apply equally to use of the methods and system on board any type of vehicle in order to create vehicle data-signature-maps use for diagnostics regarding automobiles, boats, industrial machines, etc.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of performing maintenance on an aircraft, the method comprising:

receiving, at a computing device, a vehicle data-signature-map of an interior of an aircraft for at least one parameter of the aircraft, wherein the vehicle data-signature-map is based on sensor outputs for the at least one parameter obtained during flight of the aircraft and received from sensors of mobile devices positioned at locations in the interior of a fuselage of the aircraft, and wherein the vehicle data-signature-map is a graphical representation indicative of a distribution of the at least one parameter at the locations within the interior of the fuselage of the aircraft;

comparing the vehicle data-signature-map with a previous vehicle data-signature-map of the aircraft;

based on differences of the vehicle data-signature-map as compared to the previous vehicle data-signature-map, making a determination for maintenance of a seat in the fuselage of the aircraft; and generating and outputting, by the computing device, a recommendation for inspection of an identified portion of the aircraft including the seat in the fuselage based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

2. The method of claim 1, further comprising:
comparing the vehicle data-signature-map with vehicle data-signature-maps of different aircraft from a fleet of the aircraft, wherein the fleet of the aircraft are a same type of aircraft as the aircraft; and
wherein making the determination for maintenance of the aircraft further comprises, based on differences of the vehicle data-signature-map as compared to the vehicle data-signature-maps of different aircraft from the fleet of the aircraft, making the determination for maintenance of the aircraft.

3. The method of claim 1, further comprising:
receiving a fault code from an aircraft sensor system indicative of a possible operational error of multiple components of the aircraft; and
wherein generating the recommendation for inspection of the identified portion of the aircraft comprises utilizing the vehicle data-signature-map to identify a component from among the multiple components of the aircraft that is most likely causing the fault code.

4. The method of claim 1, wherein the at least one parameter of the aircraft is indicative of turbulence of the aircraft during the flight and wherein the vehicle data-signature-map indicates a distribution of vibration of the aircraft, and the method further comprises:
determining the identified portion of the aircraft as an area of the aircraft having a vibration parameter being substantially different than distribution of the vibration parameter in the vehicle data-signature-map for other portions of the aircraft.

5. The method of claim 1, wherein the vehicle data-signature-map is indicative of the distribution of the at least one parameter within the interior of the aircraft over time during the flight of the aircraft, and the method further comprises:
associating weather information for the flight of the aircraft over the time during the flight of the aircraft with the vehicle data-signature-map;
verifying whether the distribution of the at least one parameter within the interior of the aircraft on the vehicle data-signature-map complies with the weather information for the flight; and
based on the distribution of the at least one parameter within the interior of the aircraft on the vehicle data-signature-map not complying with the weather information for the flight, generating and outputting the recommendation for inspection of the identified portion of the aircraft.

6. The method of claim 1, wherein the vehicle data-signature-map is indicative of the distribution of the at least one parameter within the interior of the aircraft over time during the flight of the aircraft, and the method further comprises:
associating geographic location information for the flight of the aircraft over the time during the flight of the aircraft with the vehicle data-signature-map;
verifying whether the distribution of the at least one parameter within the interior of the aircraft on the vehicle data-signature-map complies with the geographic location information for the flight; and
based on the distribution of the at least one parameter within the interior of the aircraft on the vehicle data-signature-map not complying with the geographic location information for the flight, generating and outputting the recommendation for inspection of the identified portion of the aircraft.

7. The method of claim 1, wherein the vehicle data-signature-map is indicative of the distribution of the at least one parameter within the interior of the aircraft over time during the flight of the aircraft, and the method further comprises:
associating a flight plan for the flight of the aircraft over the time during the flight of the aircraft with the vehicle data-signature-map;
verifying whether the distribution of the at least one parameter within the interior of the aircraft on the vehicle data-signature-map complies with the flight plan for the flight; and
based on the distribution of the at least one parameter within the interior of the aircraft on the vehicle data-signature-map not complying with the flight plan for the flight, generating and outputting the recommendation for inspection of the identified portion of the aircraft.

8. The method of claim 1, wherein receiving the vehicle data-signature-map comprises receiving the vehicle data-signature-map in real time during the flight of the aircraft, and the method further comprising:
based on the differences of the vehicle data-signature-map as compared to the previous vehicle data-signature-map, identifying an anomaly of the flight; and
adjusting an operational parameter of an engine of the aircraft to modify the flight of the aircraft based on identifying the anomaly of the flight.

9. The method of claim 1, wherein receiving the vehicle data-signature-map comprises receiving the vehicle data-signature-map in real time during the flight of the aircraft, and the method further comprising:
based on the differences of the vehicle data-signature-map as compared to the previous vehicle data-signature-map, identifying an anomaly of the flight; and
adjusting an operational parameter of the aircraft to modify the flight of the aircraft based on identifying the anomaly of the flight.

10. The method of claim 1, wherein receiving the vehicle data-signature-map comprises receiving the vehicle data-signature-map in real time during the flight of the aircraft, and the method further comprising:
based on the differences of the vehicle data-signature-map as compared to the previous vehicle data-signature-map, identifying an anomaly of the flight; and
adjusting, during the flight, the at least one parameter within the interior of the aircraft based on identifying the anomaly of the flight.

11. The method of claim 1, wherein the vehicle data-signature-map is indicative of the distribution of the at least one parameter within the interior of the aircraft over time during the flight of the aircraft, and the method further comprises:
associating a flight plan and waypoints flown for the flight of the aircraft over the time during the flight of the aircraft with the vehicle data-signature-map;
based on the differences of the vehicle data-signature-map as compared to the previous vehicle data-signature-map, identifying an anomaly of the flight;
mapping the anomaly of the flight to the flight plan and at least one waypoint flown for the flight; and
generating and outputting, by the computing device, a recommendation for a change to the flight plan for future flights based on the anomaly of the flight.

12. The method of claim 11, further comprising:
associating weather information for the flight of the aircraft over the time during the flight of the aircraft with the vehicle data-signature-map;
based on the anomaly of the flight occurring during a weather condition as indicated by the weather information, associating the anomaly of the flight with the weather condition; and
based on the anomaly of the flight occurring at times other than the weather condition, (i) mapping the anomaly of the flight to the flight plan and the at least one waypoint flown for the flight, and (ii) generating and outputting, by the computing device, the recommendation for the change to the flight plan for future flights based on the anomaly of the flight.

13. A non-transitory computer readable medium having stored thereon instructions, that when executed by one or more processors of a computing device, cause the computing device to perform functions comprising:
receiving, at a computing device, a vehicle data-signature-map of an interior of an aircraft for at least one parameter of the aircraft, wherein the vehicle data-signature-map is based on sensor outputs for the at least one parameter obtained during flight of the aircraft and received from sensors of mobile devices positioned at locations in the interior of a fuselage of the aircraft, and wherein the vehicle data-signature-map is a graphical representation indicative of a distribution of the at least one parameter at the locations within the interior of the fuselage of the aircraft;
comparing the vehicle data-signature-map with a previous vehicle data-signature-map of the aircraft;
based on differences of the vehicle data-signature-map as compared to the previous vehicle data-signature-map, making a determination for maintenance of a seat in the fuselage of the aircraft; and
generating and outputting, by the computing device, a recommendation for inspection of an identified portion of the aircraft including the seat in the fuselage based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

14. The non-transitory computer readable medium of claim 13, wherein the functions further comprise:
receiving a fault code from an aircraft sensor system indicative of a possible operational error of multiple components of the aircraft; and
wherein generating the recommendation for inspection of the identified portion of the aircraft comprises utilizing the vehicle data-signature-map to identify a component from among the multiple components of the aircraft that is most likely causing the fault code.

15. The non-transitory computer readable medium of claim 13, wherein the vehicle data-signature-map is indicative of the distribution of the at least one parameter within the interior of the aircraft over time during the flight of the aircraft, and wherein the functions further comprise:
associating weather information for the flight of the aircraft over the time during the flight of the aircraft with the vehicle data-signature-map;
verifying whether the distribution of the at least one parameter within the interior of the aircraft on the vehicle data-signature-map complies with the weather information for the flight; and
based on the distribution of the at least one parameter within the interior of the aircraft on the vehicle data-signature-map not complying with the weather information for the flight, generating and outputting the recommendation for inspection of the identified portion of the aircraft.

16. The non-transitory computer readable medium of claim 13, wherein the vehicle data-signature-map is indicative of the distribution of the at least one parameter within the interior of the aircraft over time during the flight of the aircraft, and wherein the functions further comprise:
associating geographic location information for the flight of the aircraft over the time during the flight of the aircraft with the vehicle data-signature-map;
verifying whether the distribution of the at least one parameter within the interior of the aircraft on the vehicle data-signature-map complies with the geographic location information for the flight; and
based on the distribution of the at least one parameter within the interior of the aircraft on the vehicle data-signature-map not complying with the geographic location information for the flight, generating and outputting the recommendation for inspection of the identified portion of the aircraft.

17. A system for performing maintenance on an aircraft, the system comprising:
a computing device comprising one or more processors and a non-transitory computer readable medium having stored thereon instructions, that when executed by the one or more processors, cause the computing device to perform functions comprising:
receiving a vehicle data-signature-map of an interior of an aircraft for at least one parameter of the aircraft, wherein the vehicle data-signature-map is based on sensor outputs for the at least one parameter obtained during flight of the aircraft and received from sensors of mobile devices positioned at locations in the interior of a fuselage of the aircraft, and wherein the vehicle data-signature-map is a graphical representation indicative of a distribution of the at least one parameter at the locations within the interior of the fuselage of the aircraft;
comparing the vehicle data-signature-map with a previous vehicle data-signature-map of the aircraft;
based on differences of the vehicle data-signature-map as compared to the previous vehicle data-signature-map, making a determination for maintenance of a seat in the fuselage of the aircraft; and
generating and outputting a recommendation for inspection of an identified portion of the aircraft including the seat in the fuselage based on the distribution of the at least one parameter in the vehicle data-signature-map for the identified portion of the aircraft being substantially different than the distribution of the at least one parameter in the vehicle data-signature-map for other portions of the aircraft to assist with the maintenance of the aircraft.

18. The system of claim 17, wherein receiving the vehicle data-signature-map comprises receiving the vehicle data-signature-map in real time during the flight of the aircraft, and the functions further comprise:
based on the differences of the vehicle data-signature-map as compared to the previous vehicle data-signature-map, identifying an anomaly of the flight; and
adjusting an operational parameter of an engine of the aircraft to modify the flight of the aircraft based on identifying the anomaly of the flight.

19. The system of claim 17, wherein receiving the vehicle data-signature-map comprises receiving the vehicle data-signature-map in real time during the flight of the aircraft, and the functions further comprise:
- based on the differences of the vehicle data-signature-map as compared to the previous vehicle data-signature-map, identifying an anomaly of the flight; and
- adjusting an operational parameter of the aircraft to modify the flight of the aircraft based on identifying the anomaly of the flight.

20. The system of claim 17, wherein receiving the vehicle data-signature-map comprises receiving the vehicle data-signature-map in real time during the flight of the aircraft, and the functions further comprise:
- based on the differences of the vehicle data-signature-map as compared to the previous vehicle data-signature-map, identifying an anomaly of the flight; and
- adjusting, during the flight, the at least one parameter within the interior of the aircraft based on identifying the anomaly of the flight.

\* \* \* \* \*